(12) United States Patent
Abiko et al.

(10) Patent No.: US 10,783,344 B2
(45) Date of Patent: Sep. 22, 2020

(54) IMAGE CAPTURING APPARATUS AND BIOMETRIC AUTHENTICATION APPARATUS TO OUTPUT GUIDANCE RELATED TO DISTANCE

(71) Applicant: FUJITSU LIMITED, Kawasaki-shi, Kanagawa (JP)

(72) Inventors: Yukihiro Abiko, Kawasaki (JP); Satoshi Maeda, Atsugi (JP); Soichi Hama, Atsugi (JP); Satoshi Semba, Kawasaki (JP); Hajime Nada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 137 days.

(21) Appl. No.: 15/785,979

(22) Filed: Oct. 17, 2017

(65) Prior Publication Data
US 2018/0114050 A1    Apr. 26, 2018

(30) Foreign Application Priority Data

Oct. 20, 2016    (JP) ................................ 2016-206301

(51) Int. Cl.
| | | |
|---|---|---|
| *G06K 9/20* | (2006.01) | |
| *G02B 27/42* | (2006.01) | |
| *G06K 9/00* | (2006.01) | |
| *G02B 27/44* | (2006.01) | |
| *G06F 21/32* | (2013.01) | |

(52) U.S. Cl.
CPC ....... *G06K 9/00033* (2013.01); *G02B 27/425* (2013.01); *G02B 27/44* (2013.01); *G06F 21/32* (2013.01); *G06K 9/00912* (2013.01); *G06K 9/209* (2013.01); *G06K 9/2027* (2013.01); *G06K 9/2036* (2013.01); *G06K 2009/00932* (2013.01)

(58) Field of Classification Search
None
See application file for complete search history.

(56) References Cited

U.S. PATENT DOCUMENTS

| | | | |
|---|---|---|---|
| 9,858,490 B2 * | 1/2018 | Jo | ...................... G06K 9/00885 |
| 2006/0290781 A1 | 12/2006 | Hama | |
| 2010/0103255 A1 * | 4/2010 | Nishiwaki | ............ G06K 9/0014 348/79 |

(Continued)

FOREIGN PATENT DOCUMENTS

| | | |
|---|---|---|
| CN | 102682277 A | 9/2012 |
| EP | 2241998 A2 | 10/2010 |

(Continued)

OTHER PUBLICATIONS

Extended European Search Report dated Mar. 12, 2018 for corresponding European Patent Application No. 17196832.4, 7 pages.

*Primary Examiner* — Tahmina N Ansari
(74) *Attorney, Agent, or Firm* — Fujitsu Patent Center

(57) ABSTRACT

A camera captures an image of a subject, and a light source illuminates with light a plane intersecting an optical axis of the camera at a prescribed angle. The processor generates guidance information related to a distance between the subject and the light source on the basis of a pixel value distribution of the image of the subject which is illuminated with the light, and outputs the generated guidance information.

14 Claims, 27 Drawing Sheets

(56) References Cited

U.S. PATENT DOCUMENTS

| | | | |
|---|---|---|---|
| 2010/0128053 A1* | 5/2010 | Kato | ........................ G09G 5/06 |
| | | | 345/589 |
| 2014/0294251 A1* | 10/2014 | Jo | ...................... G06K 9/00885 |
| | | | 382/115 |
| 2015/0065803 A1* | 3/2015 | Douglas | ............. A61B 1/00009 |
| | | | 600/200 |
| 2016/0209668 A1 | 7/2016 | Maeda et al. | |
| 2018/0114050 A1* | 4/2018 | Abiko | .................. G02B 27/425 |

FOREIGN PATENT DOCUMENTS

| | | |
|---|---|---|
| EP | 2410485 A1 | 1/2012 |
| EP | 2498204 A1 | 9/2012 |
| EP | 2919157 A1 | 9/2015 |
| JP | 2007-010346 | 1/2007 |
| JP | 2016-133905 | 7/2016 |

* cited by examiner

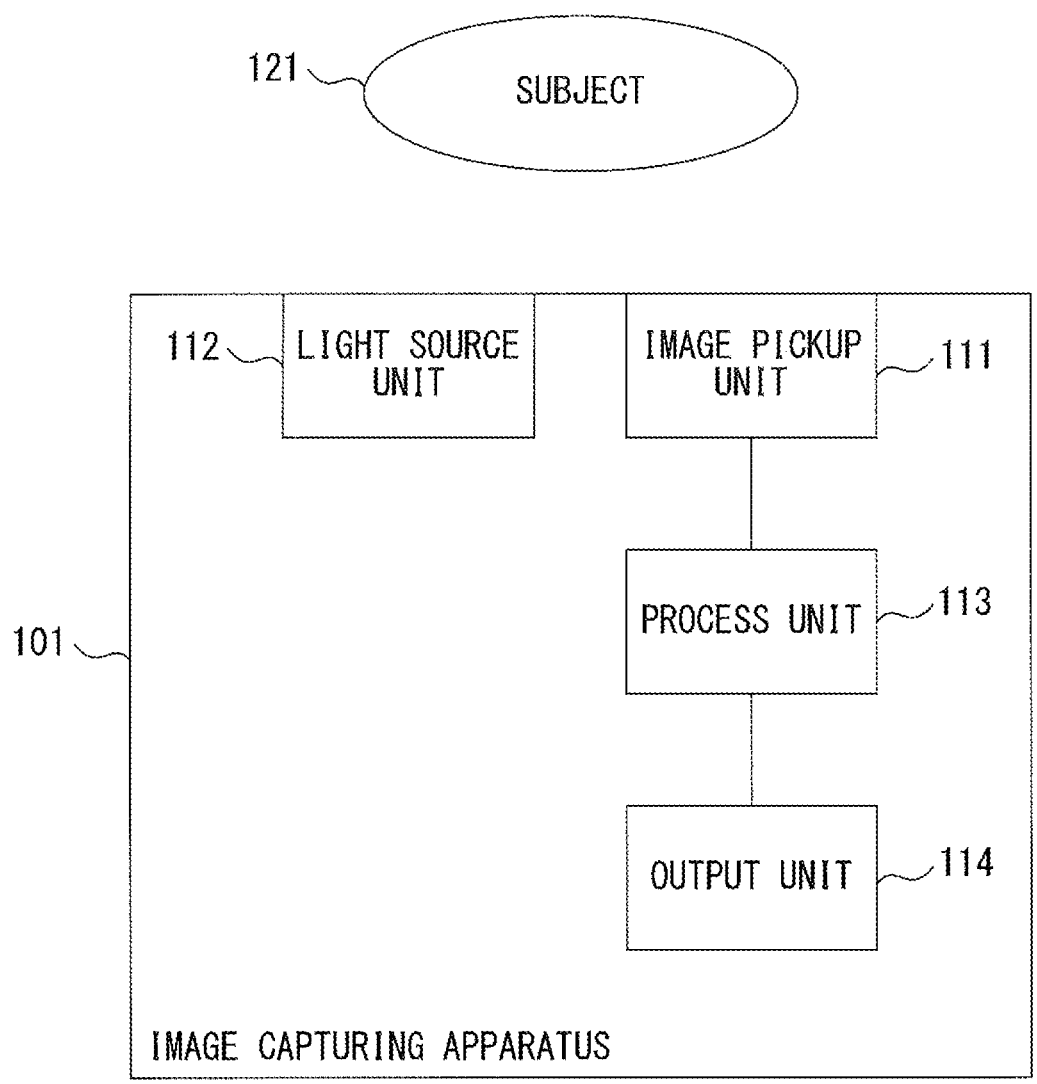
F I G. 1

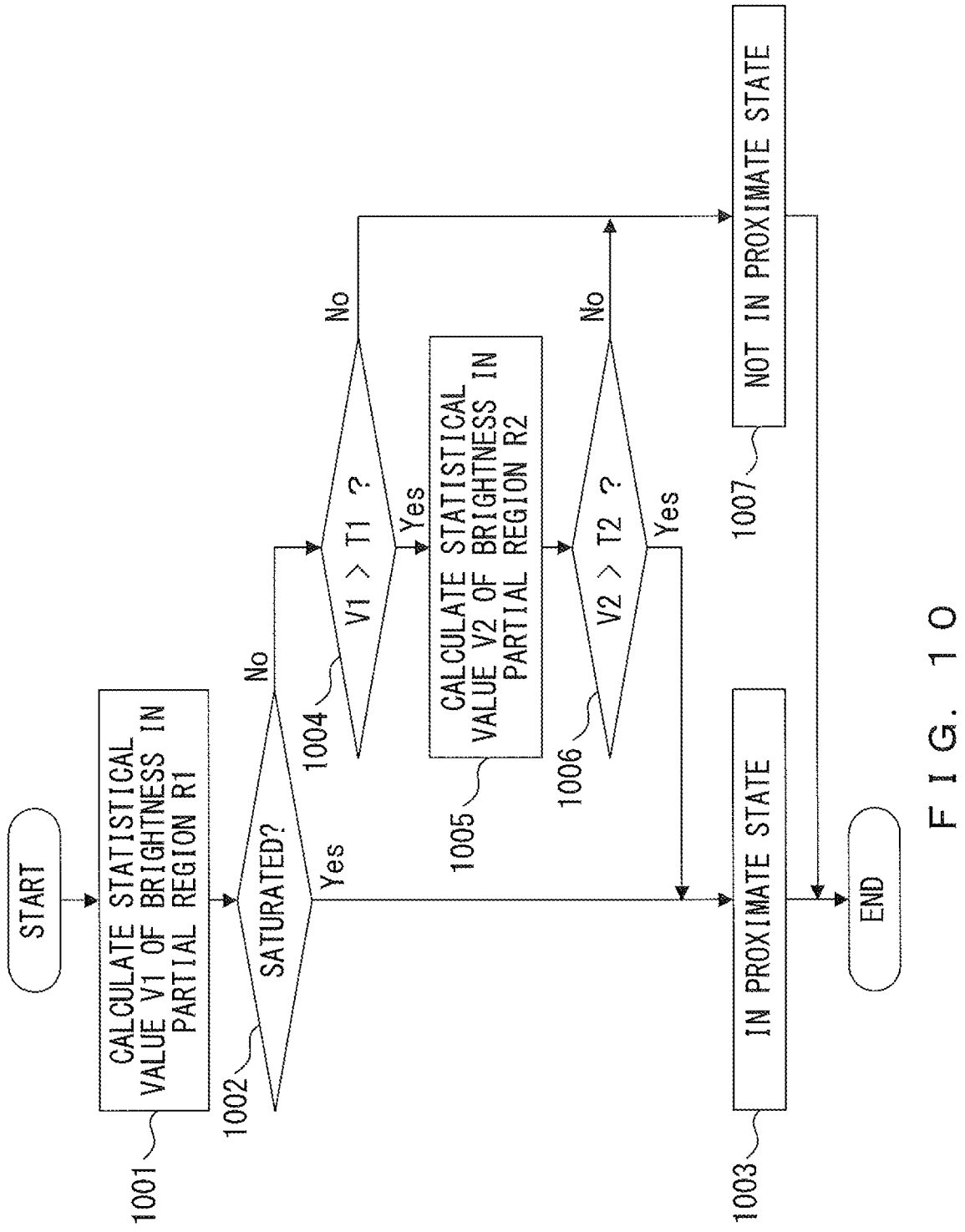
F I G. 10

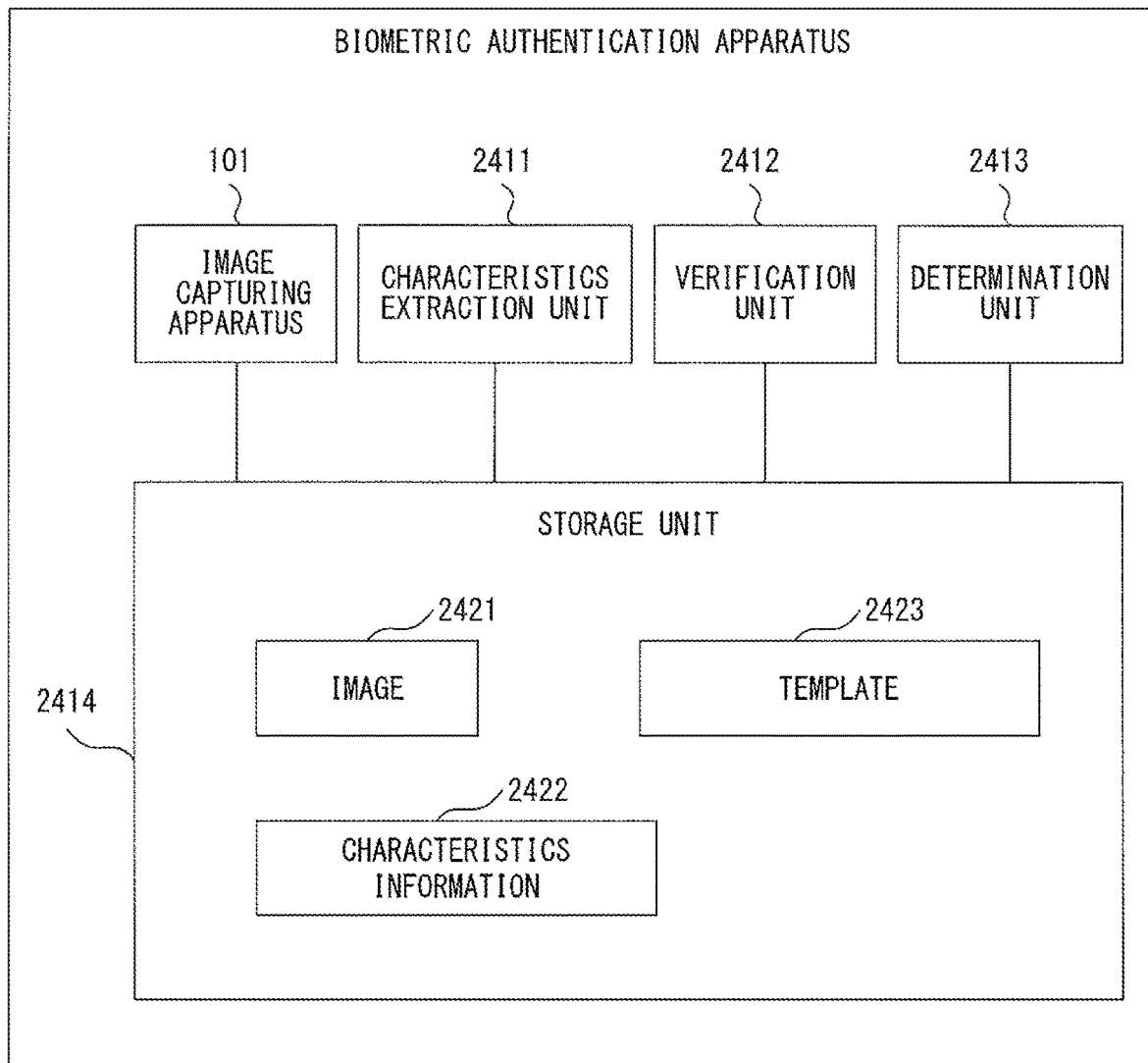
F I G. 24

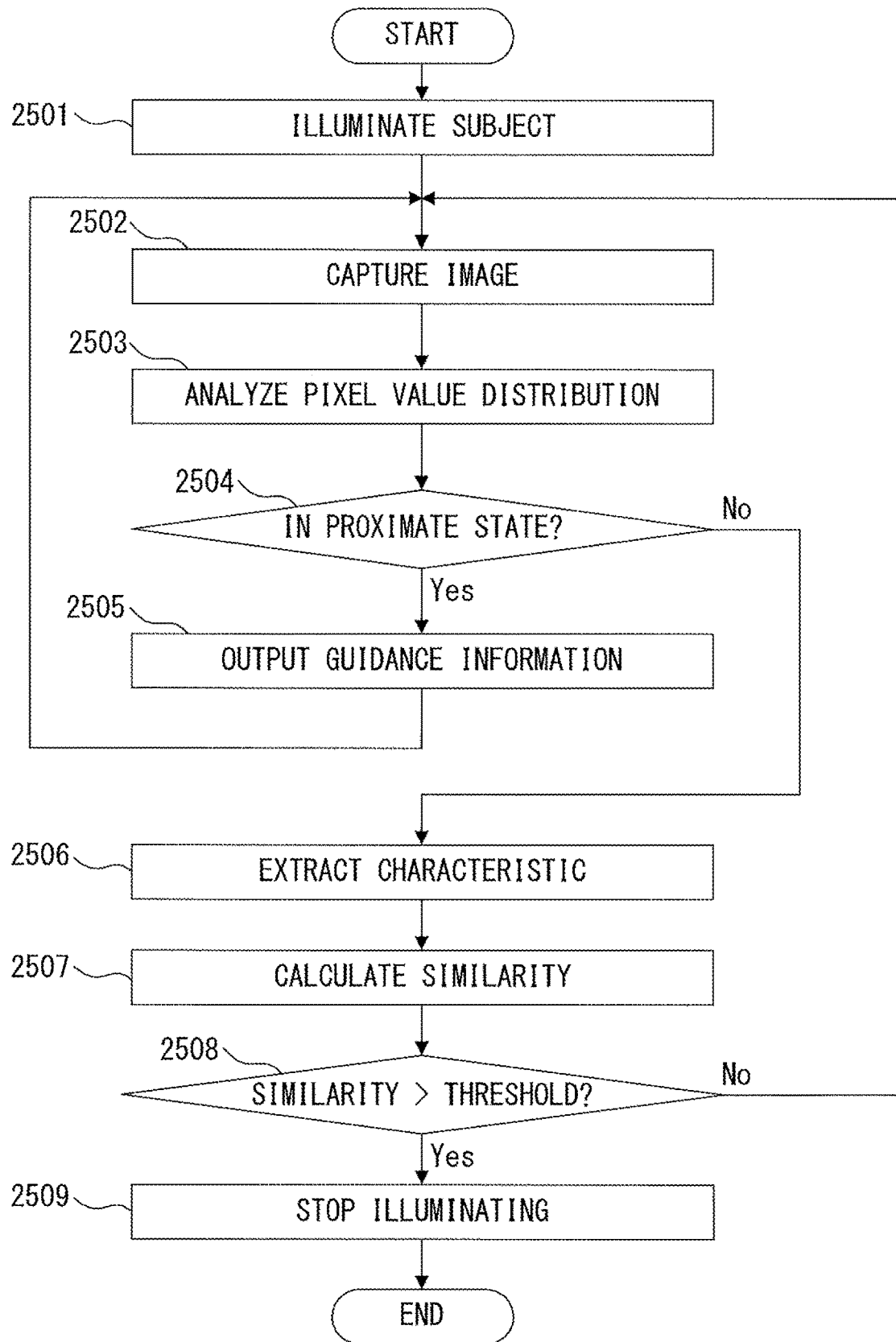
F I G. 2 5

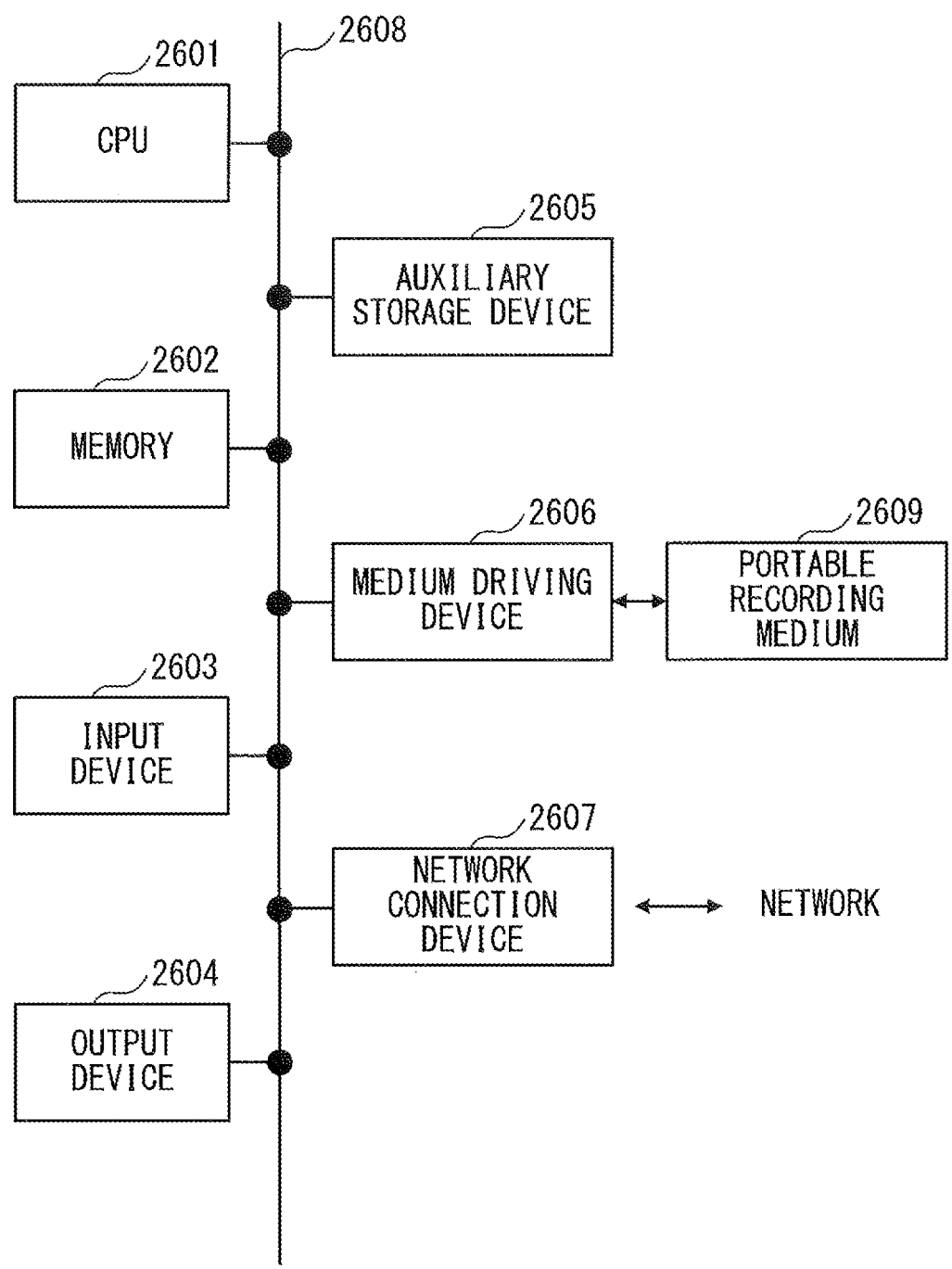
F I G. 2 6

IMAGE CAPTURING APPARATUS AND BIOMETRIC AUTHENTICATION APPARATUS TO OUTPUT GUIDANCE RELATED TO DISTANCE

CROSS-REFERENCE TO RELATED APPLICATION

This application is based upon and claims the benefit of priority of the prior Japanese Patent Application No. 2016-206301, filed on Oct. 20, 2016, the entire contents of which are incorporated herein by reference.

FIELD

The embodiments discussed herein are related to an image capturing apparatus and a biometric authentication apparatus.

BACKGROUND

Biometric authentication technology is technology that performs personal authentication by using physical characteristics such as fingerprints, palm prints, palm shapes, veins, faces, etc. or using behavioral characteristics such as signatures, vocal prints, etc. When for example biometric information such as the palm print, palm shape, veins, etc. of a palm is to be read in a contactless manner, a sensor is sometimes used that includes a light source unit for illuminating a living body with light and an image pickup unit for capturing an image of the living body.

An image pickup device that detects the position of an image capturing target etc. and an illumination device etc. that evens the distribution of light intensity are also known (see Patent Documents 1 and 2 for example).

Patent Document 1: Japanese Laid-open Patent Publication No. 2007-10346
Patent Document 2: Japanese Laid-open Patent Publication No. 2016-133905

SUMMARY

According to an aspect of the embodiments, the image capturing apparatus includes a camera, a light source and a processor coupled to the camera. The camera captures an image of a subject, and the light source illuminates with light a plane that intersects an optical axis of the camera at a prescribed angle. The processor generates guidance information related to a distance between the subject and the light source on the basis of a pixel value distribution of the image of the subject which is illuminated with the light, and outputs the generated guidance information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a configuration of an image capturing apparatus;
FIG. 10 is a flowchart of a proximate state determination process using two partial regions;
FIG. 24 illustrates a functional configuration of a biometric authentication apparatus;
FIG. 25 is a flowchart of a biometric authentication process;
and
FIG. 26 illustrates a configuration of an information processing apparatus.

DESCRIPTION OF EMBODIMENTS

Figure 2:
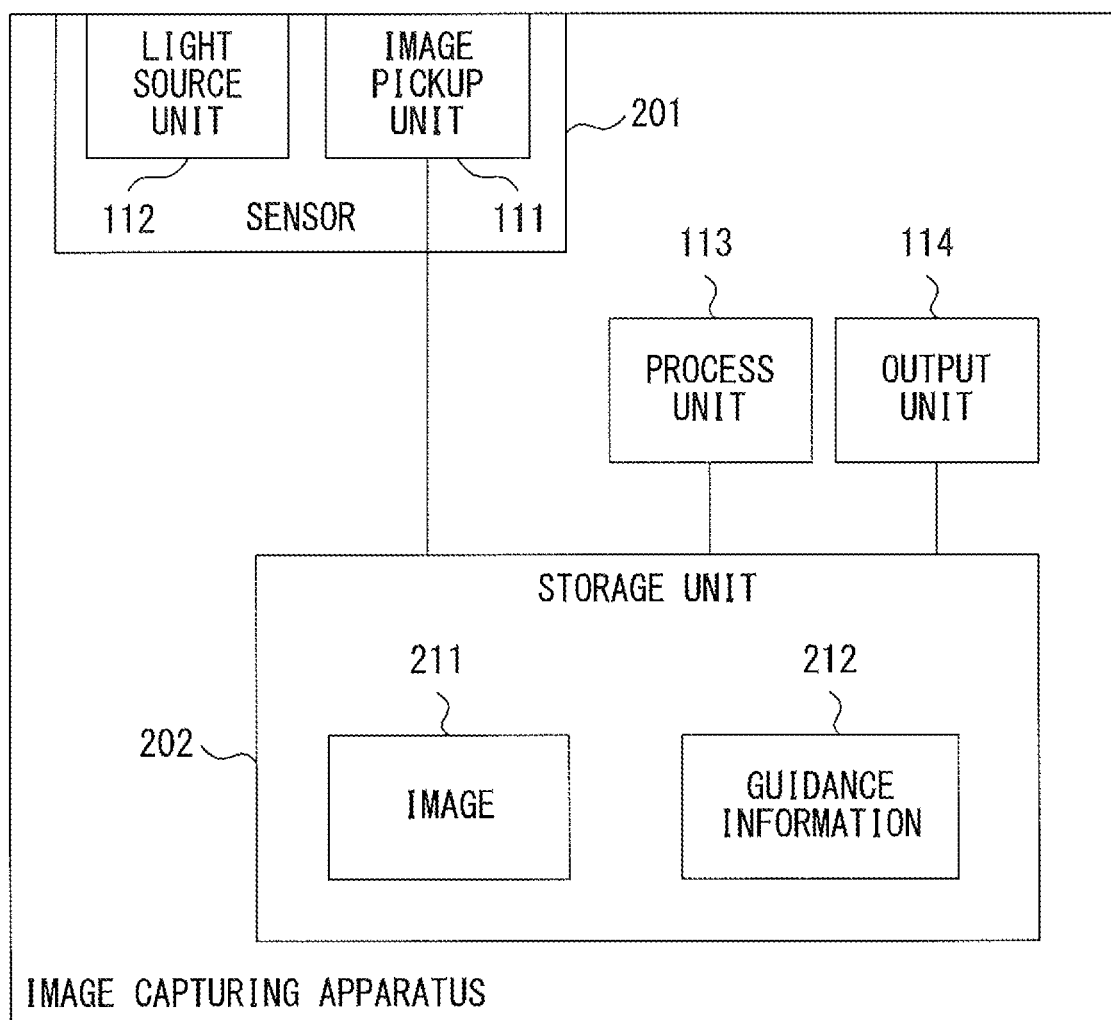
FIG. 2 is a configuration view illustrating a specific example of the image capturing apparatus.

Hereinafter, by referring to the drawings, the embodiments will be explained in detail.

When biometric information is to be read by using a sensor including a light source unit and an image pickup unit, it is desirable that a living body serving as the subject be within a range of image-capturing distance that is determined on the basis of the depth of field of the image pickup unit.

Meanwhile, the intensity of the illumination light emitted from the light source unit becomes lower in inverse proportion to the square of the distance, whereas when the subject exists very close to the light source unit, the subject is sometimes illuminated with brightness that exceeds the upper limit of the dynamic range of the image pickup unit. This causes a saturated state in the whole or part of an image that is captured. In a region that is in a saturated state, the brightness of all pixels exceeds the maximum value of the quantization level, leading to a situation where the pixels are quantized to that maximum value. This result in an unclear image, leading to a possibility that accurate biometric information will not be obtained.

In recent years, biometric authentication technology has been applied to personal authentication for restriction of accesses to personal information, for mobile banking or for mobile payment. Downsizing has advanced year by year for information terminals such as smartphones, tablets, etc. to which the biometric authentication technology is applied, and further downsizing is desired for sensors for reading biometric information as well.

In order to downsize information terminals, a sensor is installed in a frame portion of an information terminal, which sometimes results in an asymmetric arrangement between the light source unit and the image pickup unit. This sometimes leads to a situation where the illumination light is sometimes too intense when a subject exists very close to the light source unit, causing the image to be in a saturated state as described above or causing uneven intensity distribution of the illumination light on the subject and thus it is not possible to obtain a clear image.

In view of this, a method as described in Patent Document 1 may be possible in which a distance sensor, a proximity detection sensor or other devices are provided separately in order to capture an image of a subject at an appropriate distance. However, providing a distance sensor, a proximity detection sensor or other devices separately leads to an increase in the number of components, making it difficult to downsize the information terminal.

Note that this problem arises not only in a case of capturing an image of a living body for biometric authentication but also in a case of capturing images of other types of subjects.

FIG. 1 illustrates a configuration example of an image capturing apparatus. The image capturing apparatus 101 illustrated in FIG. 1 includes an image pickup unit 111, alight source unit 112, a process unit 113 and an output unit 114. The image pickup unit 111 captures an image of a subject 121, and the light source unit 112 evenly illuminates with light a plane intersecting the optical axis of the image pickup unit 111 at a prescribed angle. The process unit 113 generates guidance information related to a distance between the subject 121 and the light source unit 112 on the basis of a pixel value distribution of an image obtained by the image pickup unit 111 capturing an image of the subject 121 which is illuminated with the light. The output unit 114 outputs the guidance information generated by the process unit 113.

This image capturing apparatus 101 makes it possible to capture an image of the subject 121 at an appropriate distance by using the light source unit 112 that illuminates the subject 121 with light.

FIG. 2 illustrates a specific example of the image capturing apparatus 101. The image capturing apparatus 101 in FIG. 2 includes the process unit 113, the output unit 114, a sensor 201, and a storage unit 202, and the sensor 201 includes the image pickup unit 111 and the light source unit 112. The storage unit 202 stores an image 211 of the subject 121 captured by the image pickup unit 111.

The process unit 113 analyzes a pixel value distribution of the image 211 to obtain a light intensity distribution on the surface of the subject 121 and determines whether or not the subject 121 and the light source unit 112 are in a proximate state on the basis of the obtained light intensity distribution.

The proximate state is a state in which proximity between the subject 121 and the light source unit 112 has saturated the whole or part of the image 211 or has caused unevenness in the pixel value distribution of the image 211. In such a state, the image 211 is unclear and it is desirable to increase the distance between the subject 121 and the light source unit 112.

In view of this, when the subject 121 and the light source unit 112 are in a proximate state, the process unit 113 generates guidance information 212 for reporting the proximate state and stores the information in the storage unit 202, and the output unit 114 outputs the guidance information 212.

Figure 3:
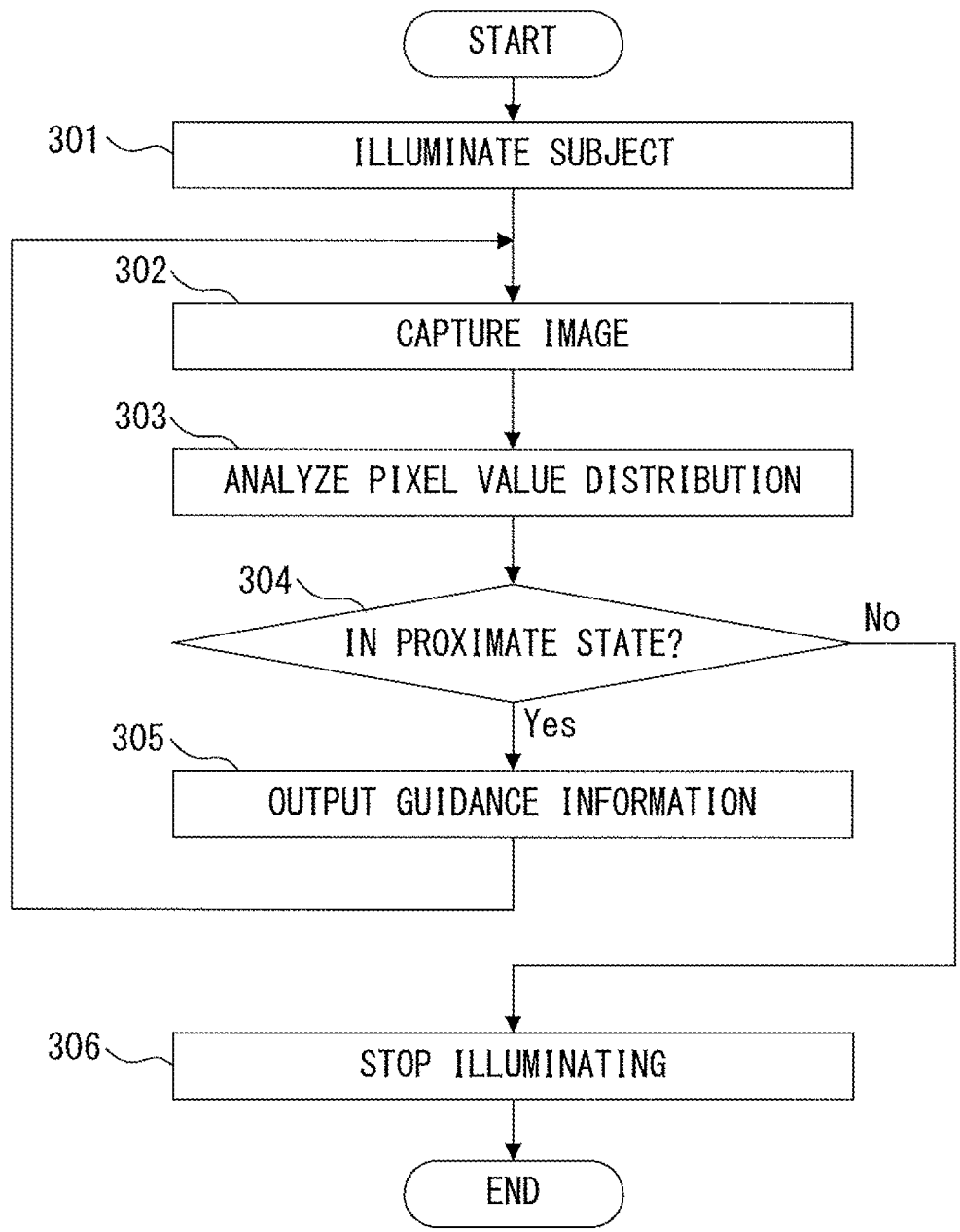
FIG. 3 is a flowchart of a proximate state detection process.

FIG. 3 is a flowchart illustrating an example of a proximate state detection process performed by the image capturing apparatus 101 of FIG. 2. First, the light source unit 112 of the sensor 201 illuminates the subject 121 with light (step 301), and the image pickup unit 111 captures an image of the subject 121 and stores the image 211 in the storage unit 202 (step 302). Next, the process unit 113 analyzes the pixel value distribution of the image 211 (step 303) so as to determine whether or not the subject 121 and the light source unit 112 are in a proximate state (step 304).

When the subject 121 and the light source unit 112 are in a proximate state (YES in step 304), the process unit 113 generates the guidance information 212 for reporting the proximate state and the output unit 114 outputs the guidance information 212 (step 305). Then, the image capturing apparatus 101 repeats the processes in and subsequent to step 302. When the subject 121 and the light source unit 112 are not in a proximate state (NO in step 304), the light source unit 112 stops illuminating the subject 121 (step 306).

Figure 4A:
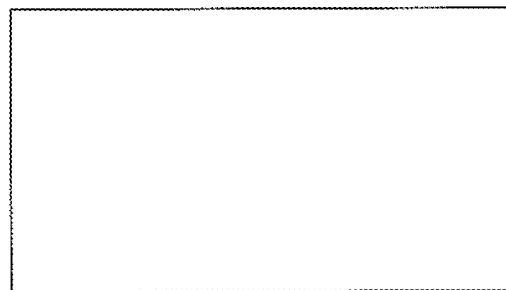
FIG. 4A illustrates a pixel value distribution in a case when an entire image is saturated.
Figure 4B:
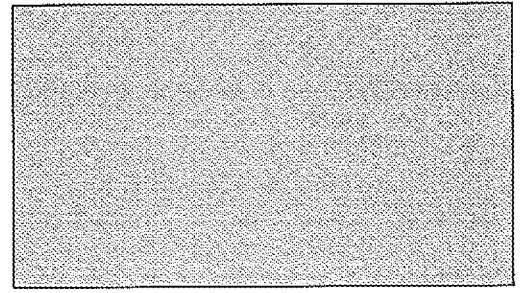
FIG. 4B illustrates a pixel value distribution in a case when an image is not saturated.

FIG. 4A and FIG. 4B illustrate examples of pixel value distributions of the image 211. FIG. 4A illustrates a brightness distribution in a case when the entire image 211 is saturated. In this case, the subject 121 and the light source unit 112 are determined to be in a proximate state. FIG. 4B illustrates a brightness distribution in a case when the image 211 is not saturated. In this case, the subject 121 and the light source unit 112 are determined to be not in a proximate state.

Figure 5A:
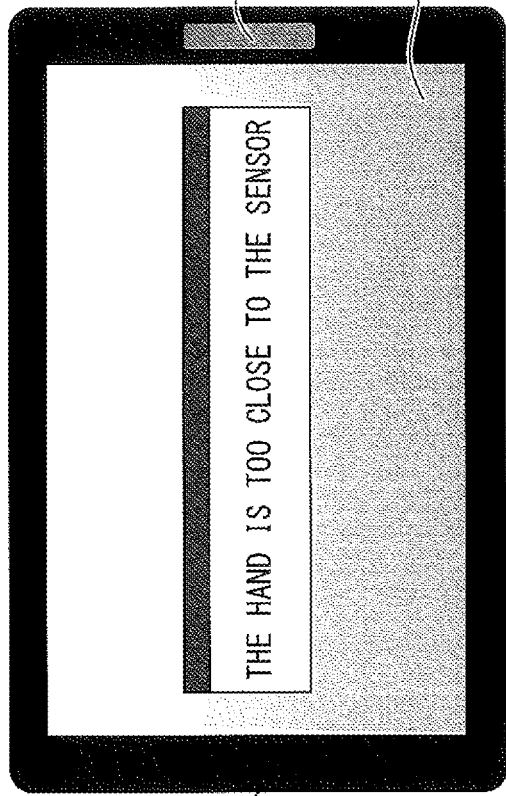
FIG. 5A illustrates guidance information reporting a detection result of a proximate state.
Figure 5B:
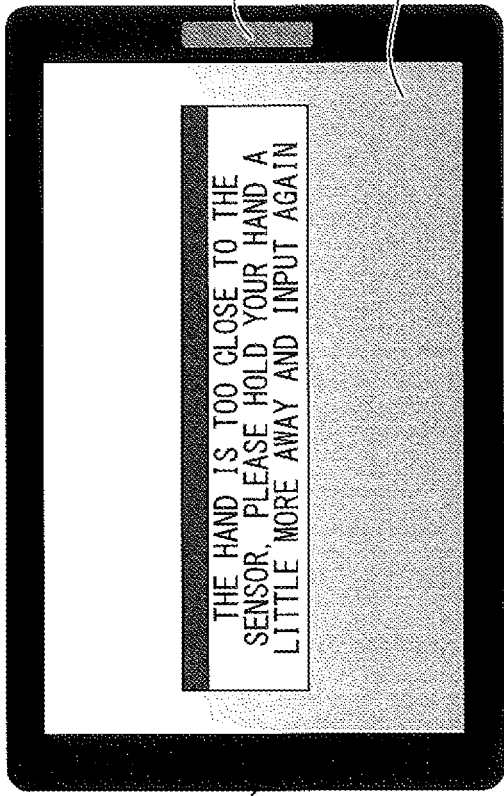
FIG. 5B illustrates guidance information prompting the removal of a proximate state.

FIG. 5A and FIG. 5B illustrate examples of the guidance information 212. In these examples, the image capturing apparatus 101 includes the sensor 201 and a display device 501 and a palm is used as the subject 121. The display device 501 corresponds to the output unit 114 of FIG. 2 and displays a message as the guidance information 212.

FIG. 5A illustrates a message for reporting only a detection result of a proximate state. In this example, a message of "the hand is too close to the sensor" is displayed. FIG. 5B illustrates a message for reporting a detection result of a proximate state and for prompting the removal of the proximate state. In this example, a message of "the hand is too close to the sensor, please hold your hand a little more away and input again" is displayed. When the user holds their hand more away from the sensor 201 in accordance with the displayed message, the image capturing apparatus 101 can again capture an image of the palm at an appropriate distance.

Figure 6:
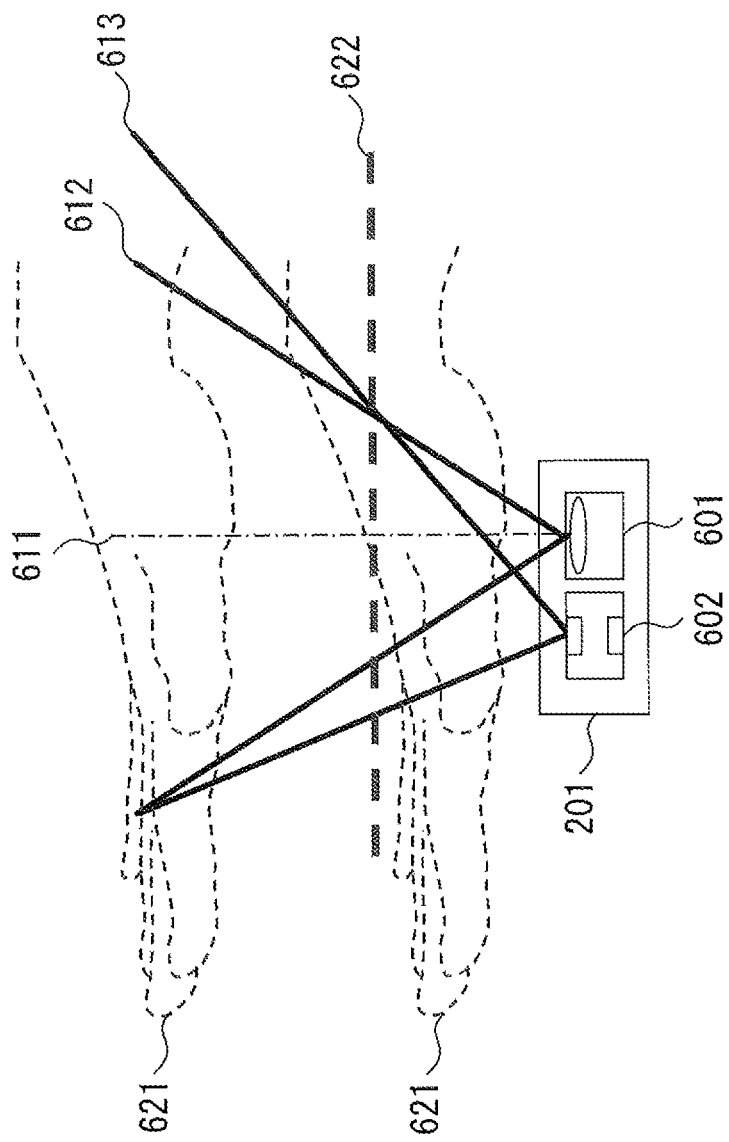
FIG. 6 illustrates a configuration of a sensor that includes a single light source.

FIG. 6 illustrates a configuration example of the sensor 201 in a case when the light source unit 112 has a single light source. The sensor 201 illustrated in FIG. 6 includes a camera 601 and a light source 602. The camera 601 and the light source 602 correspond to the image pickup unit 111 and the light source unit 112 of FIG. 2, respectively.

As the light source 602, for example the illumination device described in Patent Document 2 can be used. The illumination device of Patent Document 2 includes a light-emitting unit such as a Light-Emitting Diode (LED) and a diffraction optical element in which a plurality of diffraction gratings are arranged two dimensionally, the diffraction optical element being arranged between the light-emitting unit and the illumination region. Emitting light from the light-emitting unit via the diffraction optical element makes it possible to evenly illuminate a plane parallel to the plane on which the diffraction gratings are arranged. Thus, when a hand 621 is held against the sensor 201 in such a manner that the palm is parallel to the plane in which the diffraction gratings are arranged, the distribution of the optical intensity becomes roughly even on the surface of the palm, making it possible to obtain the image 211 in a clear state.

In such a case, the light source 602 is arranged, beside the camera 601, in a direction that is orthogonal to an optical axis 611 of the camera 601. This makes the diffraction-gratings-arranged plane included in the light source 602 orthogonal to the optical axis 611, also leading to a situation where the plane that can evenly be illuminated by the light source 602 is orthogonal to the optical axis 611.

In a scope where an image-capturing scope 612 determined by the angular field to the camera 601 and an illumination scope 613 of the light source 602 are overlapping, the region of the palm for which an image is to be captured by the camera 601 is evenly illuminated, making it possible to obtain the image 211 as illustrated in FIG. 4B. Accordingly, when a palm is more distant from the sensor 201 than is the plane 622, the distance between the palm and the sensor 201 can be considered to be appropriate. When the palm is closer to the sensor 201 than is the plane 622, the palm and the sensor 201 are in a proximate state, causing an uneven pixel value distribution of the image 211.

Figure 7:
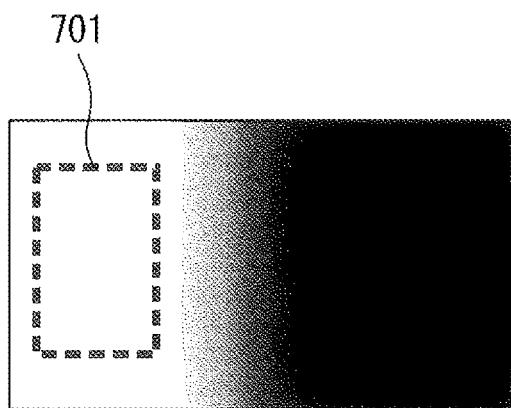
FIG. 7 illustrates an image in a proximate state.

FIG. 7 illustrates an example of the image 211 in the proximate state in the configuration illustrated in FIG. 6. In such a case, the center of the image 211 corresponds to the position of the optical axis 611, and the left side of the center is a region in which the palm portion closer to the light source 602 is captured while the right side of the center is a region in which the palm portion more distant from the light source 602 is captured. In a proximate state, part of a region on the left side is often saturated, and thus by setting for example a partial region 701 as a region of interest (ROI), it is possible to detect a proximate state.

Figure 8:
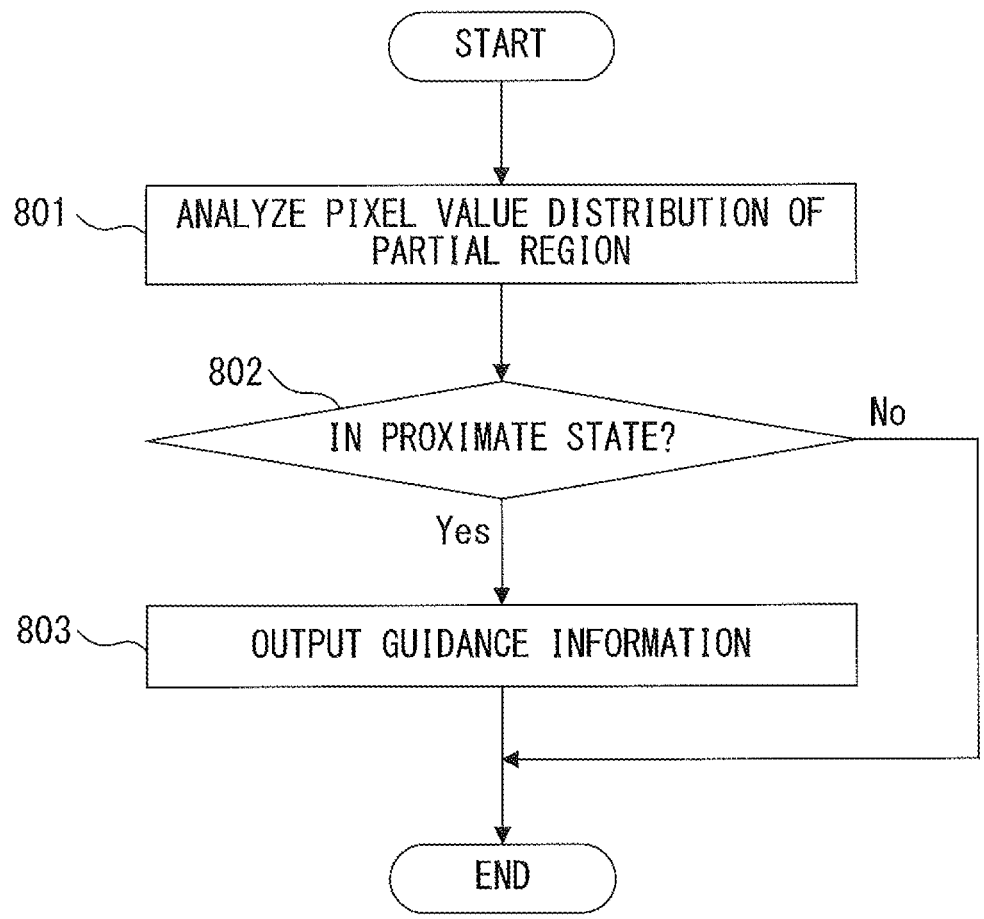
FIG. 8 is a flowchart of a proximate state determination process using a partial region.

FIG. 8 illustrates a flowchart illustrating an example of a proximate state determination process using a partial region in the configuration of FIG. 6. The proximate state determination process of FIG. 8 corresponds to the processes in step 303 through step 305 of FIG. 3. First, the process unit 113 analyzes the pixel value distribution in the partial region 701 (step 801), and determines whether or not the subject 121 and the sensor 201 are in a proximate state on the basis of a computation result based on the pixel values of a plurality of pixels in the partial region 701 (step 802).

For example, when the partial region 701 is saturated, the process unit 113 determines that the subject 121 and the sensor 201 are in a proximate state, and when the partial region 701 is not saturated, the process unit 113 determines that the subject 121 and the sensor 201 are not in a proximate state. When any of the indexes below is greater than a prescribed value, the process unit 113 can determine that the partial region 701 is saturated and when the indexes are equal to or smaller than the prescribed value, the process unit 113 can determine that the partial region 701 is not saturated.

(1) Statistical Value of Brightness in the Partial Region 701

As a statistical value of brightness, for example the average value, the median value, the mode value, etc. of the brightness of a plurality of pixels included in the partial region 701 is used, and as a prescribed value, a value close to the maximum value of the quantization level is used. The prescribed value may be a value within a scope from 90% through 100% of the maximum value of the quantization level.

(2) Ratio of Saturated Pixels in the Partial Region 701

The ratio of saturated pixels represents the ratio of the number of pixels having brightness that is equal to or greater than the maximum value of the quantization level to the total number of the pixels included in the partial region 701, and as the prescribed value, a value close to one is used. The prescribed value may be a value within a scope from 0.9 through 1.

When the subject 121 and the sensor 201 are in a proximate state (YES in step 802), the process unit 113 generates guidance information 212 and the output unit 114 outputs the guidance information 212 (step 803). In such a case, the image capturing apparatus 101 repeats the processes in and subsequent to step 302 of FIG. 3.

When the subject 121 and the sensor 201 are not in a proximate state (NO in step 802), the process unit 113 terminates the process. In such a case, the image capturing apparatus 101 executes the process in step 306 of FIG. 3.

Figure 9:
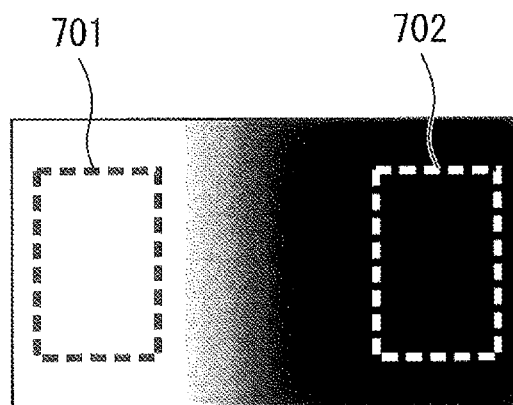
FIG. 9 illustrates an example of two partial regions in an image.

FIG. 9 illustrates an example of two partial regions in the image 211. The partial region 701 of FIG. 9 is set on the left side of the center of the image 211 and the partial region 702 is set on the right side of the center of the image 211. Accordingly, the palm portion captured in the partial region 702 is at a position that is more distant from the light source 602 than is the palm portion that is captured in the partial region 701. By setting the partial region 701 and the partial region 702 as ROI, it is possible to detect a proximate state even when the partial region 701 is not saturated.

FIG. 10 is a flowchart illustrating an example of a proximate state determination process using two partial regions. The proximate state determination process of FIG. 10 corresponds to the processes in step 303 and step 304 of FIG. 3, and partial regions R1 and R2 correspond to the partial regions 701 and 702, respectively.

First, the process unit 113 calculates statistical value V1 of the brightness in partial region R1 (step 1001), and compares statistical value V1 with the prescribed value so as to determine whether or not partial region R1 is saturated (step 1002). When partial region R1 is saturated (YES in step 1002), the process unit 113 determines that the subject 121 and the sensor 201 are in a proximate state (step 1003).

When partial region R1 is not saturated (NO in step 1002), the process unit 113 compares statistical value V1 with threshold T1 (step 1004). As threshold T1, a value that is smaller than the prescribed value used in step 1002 is used.

When statistical value V1 is greater than threshold T1 (YES in step 1004), the process unit 113 calculates statistical value V2 of the brightness in partial region R2 (step 1005), and compares statistical value V2 with threshold T2 (step 1006). As threshold T2, a value that is smaller than threshold T1 is used.

When statistical value V2 is greater than threshold T2 (YES in step 1006), the process unit 113 determines that the subject 121 and the sensor 201 are in a proximate state (step 1003). When statistical value V1 is equal to or smaller than threshold T1 (NO in step 1004) or when statistical value V2 is equal to or smaller than threshold T2 (NO in step 1006), the process unit 113 determines that the subject 121 and the sensor 201 are not in a proximate state (step 1007).

Figure 11:
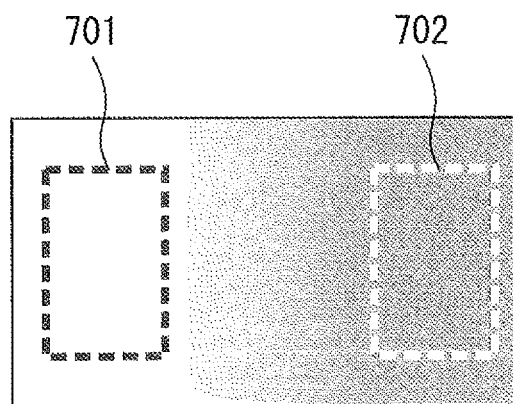
FIG. 11 illustrates an image in a case when a partial region is not saturated.

FIG. 11 illustrates an example of the image 211 in a case when the partial region 701 is not saturated. When statistical value V1 of the partial region 701 is greater than threshold T1 and statistical value V2 of the partial region 702 is greater than threshold T2, the subject 121 and the sensor 201 are determined to be in a proximate state even when the partial region 701 is not saturated.

Figure 12:
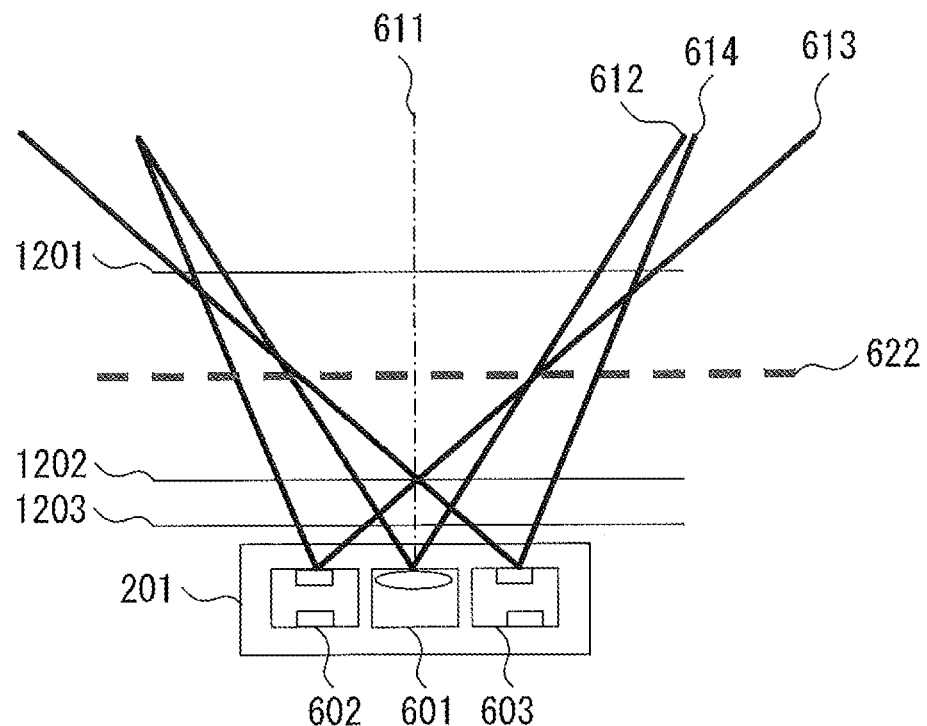
FIG. 12 illustrates a configuration of a sensor that includes two light sources.

FIG. 12 illustrates a configuration example of the sensor 201 in a case when the light source unit 112 includes two light sources. The sensor 201 illustrated in FIG. 12 includes the camera 601, the light source 602 and the light source 603. The light source 602 and the light source 603 correspond to the light source unit 112 of FIG. 2 and an illumination device similar to the light source 602 may be used as the light source 603.

In such a case, the light source 602 and the light source 603 are respectively arranged on both sides of the camera 601 in a direction that is orthogonal to the optical axis 611 of the camera 601. Thereby, the plane that can evenly be illuminated by the light source 602 and the light source 603 are orthogonal to the optical axis 611. It is desirable that a distance between the light source 603 and the camera 601 be the same as a distance between the light source 602 and the camera 601.

The light source 602 and the light source 603 may emit light of the same colors or may emit light of different colors. When they emit light of different colors, the light may be for example visible light of different wavelengths such as red and blue.

In a scope where the image-capturing scope 612 determined by the angular field of the camera 601, the illumination scope 613 of the light source 602 and the illumination scope 614 of the light source 603 are overlapping, the palm region for which an image is captured by the camera 601 is illuminated evenly. Accordingly, when a palm is more distant from the sensor 201 than is the plane 622, the distance between the palm and the sensor 201 can be considered to be appropriate. When for example, a palm is at the position of a plane 1201, the image 211 as illustrated in FIG. 4B is obtained. When the palm is closer to the sensor 201 than is the plane 622, the palm and the sensor 201 are in a proximate state, causing an uneven pixel value distribution of the image 211.

Figure 13:
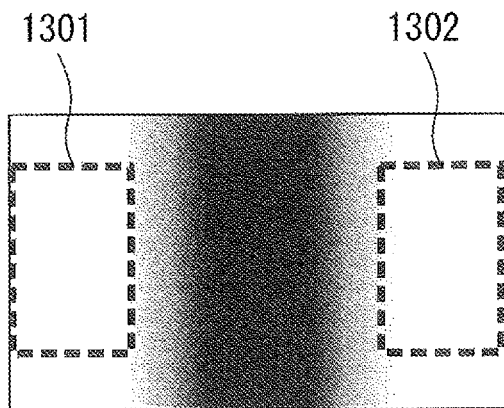
FIG. 13 illustrates an image in a proximate state in a case when two light sources are used.

FIG. 13 illustrates an example of the image 211 in a case when a palm is at the position of the plane 1203 and the palm and the sensor 201 are in a proximate state in the configuration illustrated in FIG. 12. In such a case, the center of the image 211 corresponds to the position of the optical axis 611, and the left side of the center is a region in which the palm portion closer to the light source 602 on the palm is captured while the right side of the center is a region in which the palm portion closer to the light source 603 on the palm is captured. A partial region 1301 on the left side and a partial region 1302 on the right side are saturated at the position of the plane 1203, and accordingly by setting these regions as ROI, a proximate state can be detected.

Figure 14:
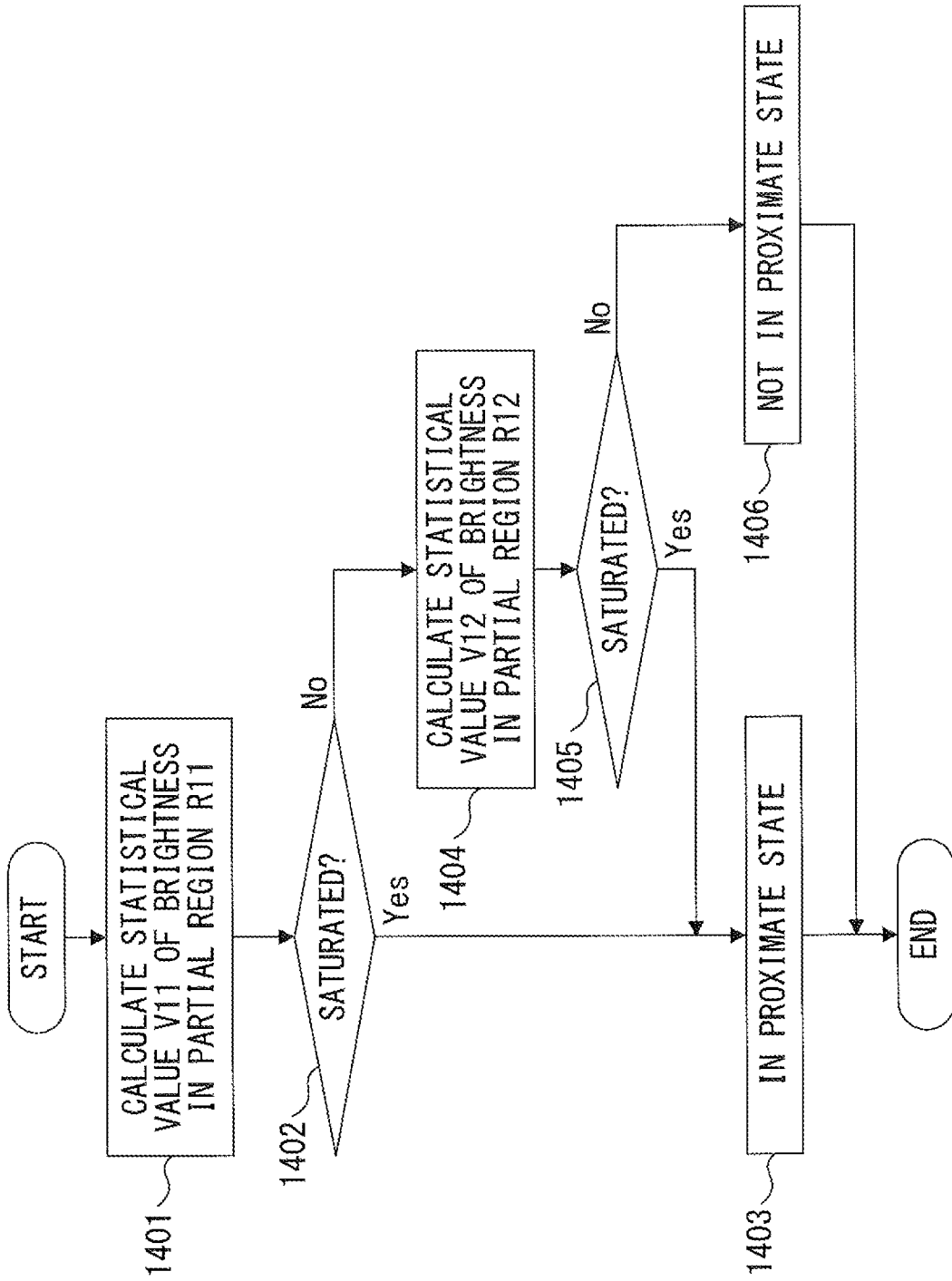
FIG. 14 is a flowchart of a proximate state determination process using two light sources.

FIG. 14 is a flowchart illustrating an example of a proximate state determination process using a partial region in the configuration of FIG. 12. Partial regions R11 and R12 illustrated in FIG. 14 correspond to the partial regions 1301 and 1302, respectively.

First, the process unit 113 calculates statistical value V11 of the brightness in partial region R11 (step 1401), and compares statistical value V11 with a prescribed value so as to determine whether or not partial region R11 is saturated (step 1402). When partial region R11 is saturated (YES in step 1402), the process unit 113 determines that the subject 121 and the sensor 201 are in a proximate state (step 1403).

When partial region R11 is not saturated (NO in step 1402), the process unit 113 calculates statistical value V12 of the brightness in partial region R12 (step 1404). Then, the process unit 113 compares statistical value V12 with the prescribed value so as to determine whether or not partial region R12 is saturated (step 1405). When partial region R12 is saturated (YES in step 1405), the process unit 113 determines that the subject 121 and the sensor 201 are in a proximate state (step 1403). When partial region R12 is not saturated (NO in step 1405), the process unit 113 determines that the subject 121 and the sensor 201 are not in a proximate state (step 1406).

Figure 15:
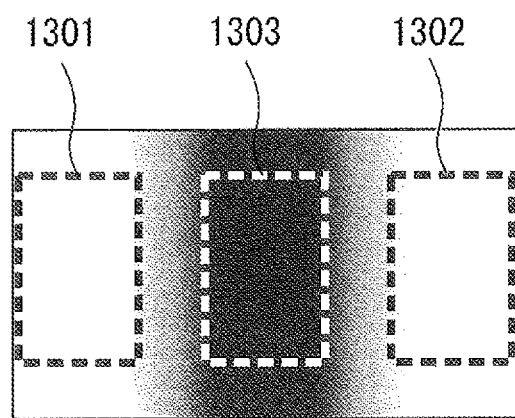
FIG. 15 illustrates three partial regions in an image.

FIG. 15 illustrates examples of three partial regions in the image 211. The partial region 1303 illustrated in FIG. 15 is set in the middle of the image 211. Accordingly, the palm portion for which an image has been captured in the partial region 1303 is at a position corresponding to the optical axis 611. By setting the partial regions 1301 through 1303 as ROI, a proximate state can be detected even when the partial regions 1301 and 1302 are not saturated.

Figure 16:
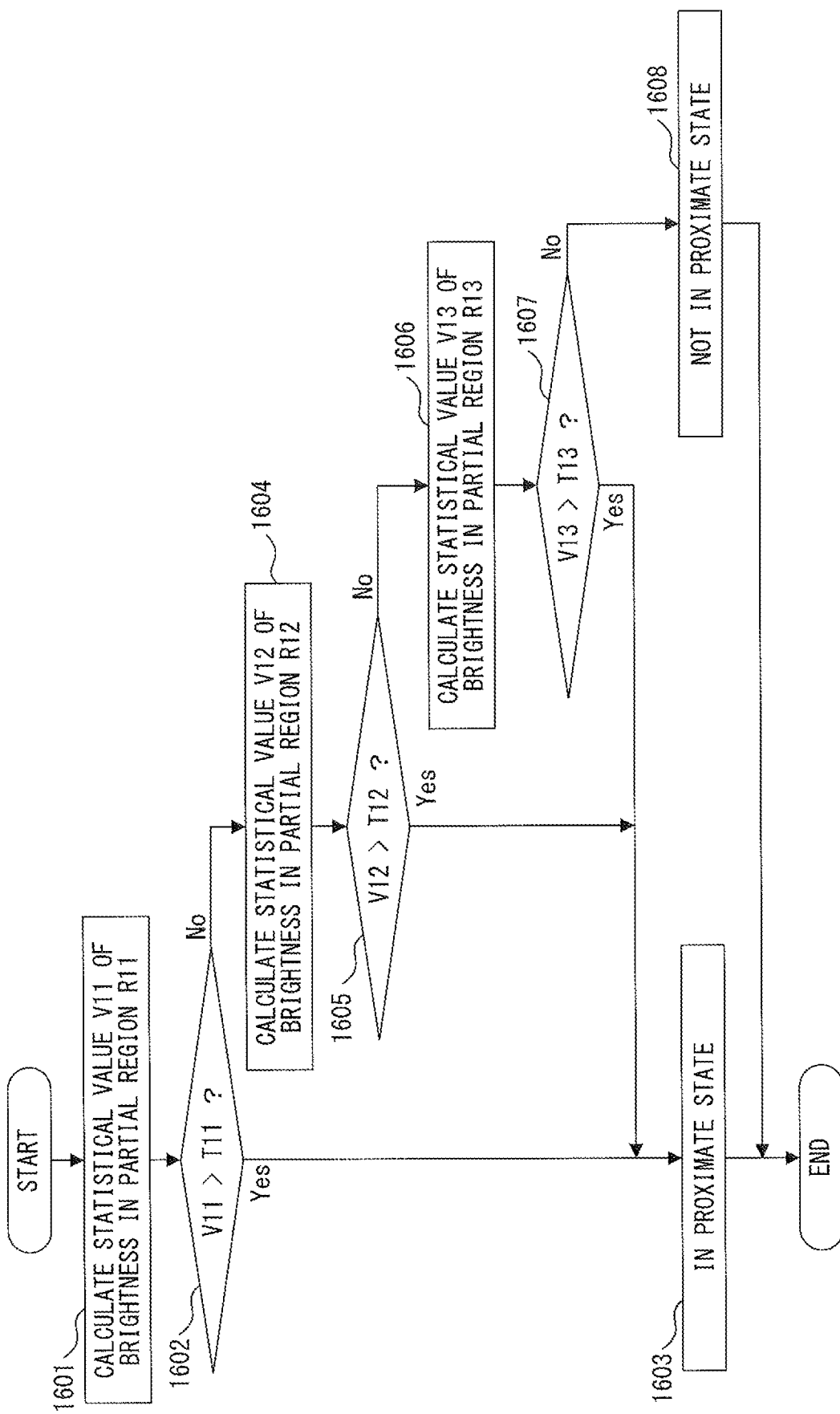
FIG. 16 is a flowchart a proximate state determination process using three partial regions.

FIG. 16 is a flowchart illustrating an example of a proximate state determination process using three partial regions. Partial regions R11 through R13 illustrated of FIG. 16 correspond to the partial regions 1301 through 1303, respectively.

First, the process unit 113 calculates statistical value V11 of the brightness in partial region R11 (step 1601), and compares statistical value V11 with threshold T11 (step 1602). As threshold T11, a value that is smaller than the prescribed value used in the processes in step 1402 and step 1405 is used.

When statistical value V11 is greater than threshold T11 (YES in step 1602), the process unit 113 determines that the subject 121 and the sensor 201 are in a proximate state (step 1603).

When statistical value V11 is equal to or smaller than threshold T11 (NO in step 1602), the process unit 113 calculates statistical value V12 of the brightness in partial region R12 (step 1604) so as to compare statistical value V12 with threshold T12 (step 1605). Threshold T12 may be the same value as threshold T11 or may be a different value.

When statistical value V12 is greater than threshold T12 (YES in step 1605), the process unit 113 determines that the subject 121 and the sensor 201 are in a proximate state (step 1603).

When statistical value V12 is equal to or smaller than threshold 112 (NO in step 1605), the process unit 113 calculates statistical value V13 of the brightness in partial region R13 (step 1606), and compares statistical value V13 with threshold T13 (step 1607). As threshold T13, a value that is equal to or smaller than threshold T11 and equal to or smaller than threshold T12 is used.

When statistical value V13 is greater than threshold T13 (YES in step 1607), the process unit 113 determines that the subject 121 and the sensor 201 are in a proximate state (step 1603). When statistical value V13 is equal to or smaller than threshold T13 (NO in step 1607), the process unit 113 determines that the subject 121 and the sensor 201 are not in a proximate state (step 1608).

Figure 17:
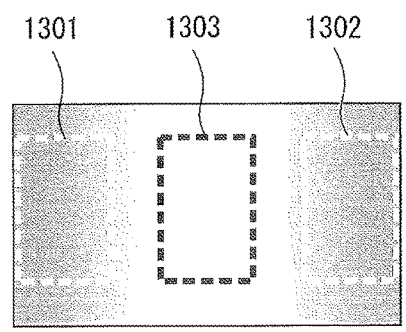
FIG. 17 illustrates an image in a case when two partial regions are not saturated.

FIG. 17 illustrates an example of the image 211 in a case when a palm exists at a position between the plane 1202 and the plane 622 and the partial regions 1301 and 1302 are not saturated. In such a case, because statistical value V13 of the partial region 1303 is greater than threshold T13, it is determined that the subject 121 and the sensor 201 are in a proximate state even when the partial regions 1301 and 1302 are not saturated. When for example only the partial region 1303 is saturated it is determined that the subject 121 and the sensor 201 are in a proximate state.

Incidentally, Japanese Patent Application No. 2015-06246, which is a prior application, describes a technique in which light of a long wavelength (red through near infrared) that is equal to or longer than 700 nm and light of a short wavelength (blue through green) that is equal to or shorter than 600 nm are emitted to a living body sequentially so as to observe an image for each wavelength and thereby the veins are observed with high accuracy. According to this technique, a filter having a different spectral transmission characteristic is provided for each pixel of the light receiving elements of the camera.

When veins are observed, the palm is illuminated with light of a long wavelength so as to capture an image via a long-wavelength filter, which has a higher transmissivity for light of a long wavelength, and thereby an image including information of both wrinkles etc. existing on the palm surface and vein patterns existing in subcutaneous tissues is captured. Also, by illuminating the palm with light of a short wavelength so as to capture an image via a short-wavelength filter, which has a higher transmissivity for light of a short wavelength, an image only including information of the palm surface is captured. Then, through prescribed computation using the two images, information of the palm surface is removed from the image captured using the long-wavelength light, and information of the vein pattern is extracted.

When the above technique of the prior application is applied to the sensor 201 of FIG. 12, the camera 601 includes a plurality of filters having different spectral transmission characteristics, and one of the light source 602 and the light source 603 emits light of a long wavelength and the other one of them emits light of a short wavelength. As a plurality of filters, for example a primary color filter such as an RGB filter, a complementary color filter such as a YMC filter, etc. are used. As light of a long wavelength, for example visible light of near infrared or red is used, and as light of a short wavelength, for example visible light of blue through green is used.

Figure 18:
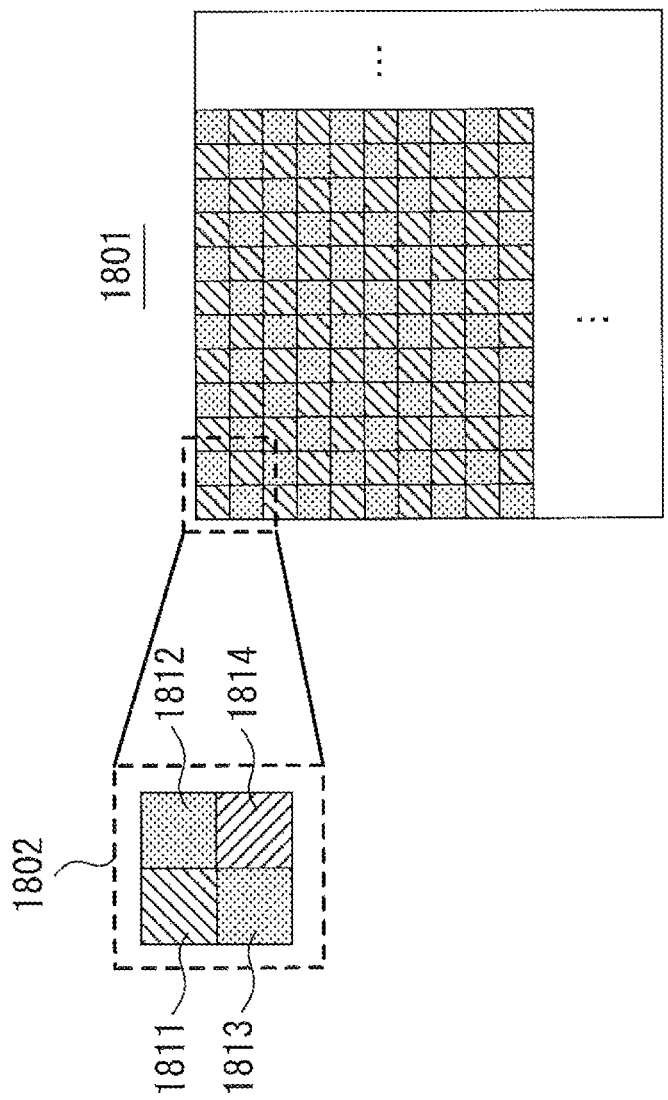
FIG. 18 illustrates an RGB filter.

FIG. 18 illustrates an example of an RGB filter. An RGB filter 1801 illustrated in FIG. 18 includes one of filters 1811 through 1814 for each pixel of the light receiving elements of the camera 601 as illustrated in the enlarged view enclosed by a dashed line 1802. The filter 1811 is an R filter, the filters 1812 and 1813 are G filters and the filter 1814 is a B filter.

For example, the R filter functions as a long-wavelength filter and a B filter functions as a short-wavelength filter. However, a near infrared ray penetrates all of the R, G and B filters. An R plane image is captured via the R filter and a B plane image is captured via the B filter.

Figure 19A:
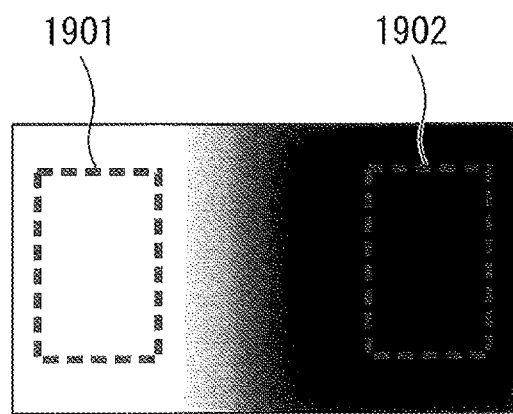
FIG. 19A illustrates an R plane image.
Figure 19B:
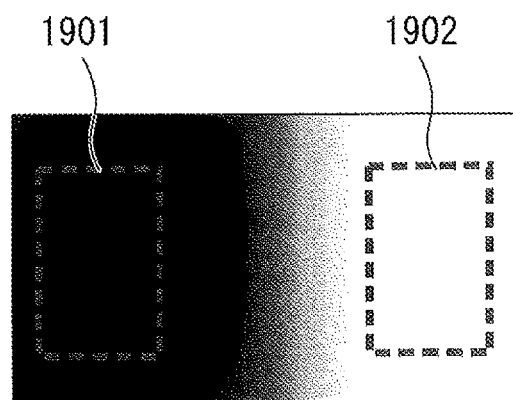
FIG. 19B illustrates a B plane image.

FIG. 19A and FIG. 19B illustrate examples of an R plane image and a B plane image in a case when the light source 602 and the light source 603 respectively emit light of a wavelength of red and light of a wavelength of blue and a palm exists at the position of the plane 1203. FIG. 19A illustrates an R plane image and FIG. 19B illustrates a B plane image. At the position of the plane 1203, the partial region 1901 on the left side in the R plane image is saturated and the partial region 1902 on the right side in the B plane image is saturated. By setting these partial regions as ROI, a proximate state can be detected.

Figure 20:
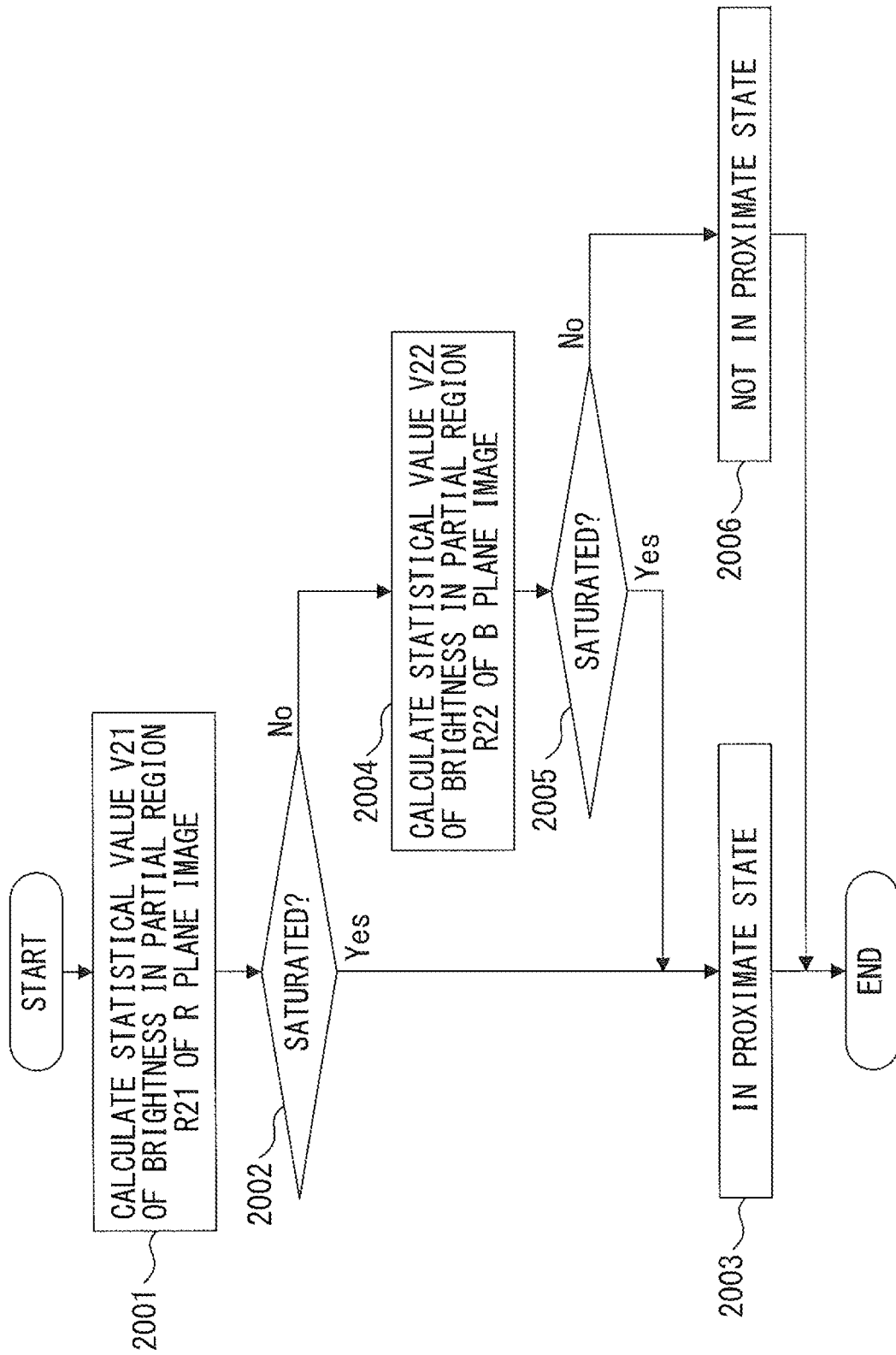
FIG. 20 is a flowchart of a proximate state determination process using an R plane image and a B plane image.

FIG. 20 is a flowchart illustrating an example of a proximate state determination process using an R plane image and a B plane image. The partial regions R21 and R22 in FIG. 20 correspond to the partial regions 1901 and 1902, respectively.

First, the process unit 113 calculates statistical value V21 of the brightness in partial region R21 of the R plane image (step S2001), and compares statistical value V21 with the prescribed value so as to determine whether or not partial region R21 is saturated (step 2002). When partial region R21 is saturated (YES in step 2002), the process unit 113 determines that the subject 121 and the sensor 201 are in a proximate state (step S2003).

When partial region R21 is not saturated (NO in step 2002), the process unit 113 calculates statistical value V22 of the brightness in partial region R22 of the B plane image (step 2004). Then, the process unit 113 compares statistical value V22 with the prescribed value so as to determine whether or not partial region R22 is saturated (step 2005). When partial region R22 is saturated (YES in step 2005), the process unit 113 determines that the subject 121 and the sensor 201 are in a proximate state (step 2003). When partial region R22 is not saturated (NO in step 2005), the process unit 113 determines that the subject 121 and the sensor 201 are not in a proximate state (step 2006).

Because a near infrared ray penetrates all of the R, G and B filters, a B plane image is captured with a near infrared ray and blue light mixed together. Thus, when a proximate state determination process is to be performed by using a plurality of thresholds as illustrated in FIG. 10, thresholds that are different between the R plane image and the B plane image are set for respective partial regions.

Figure 21A:
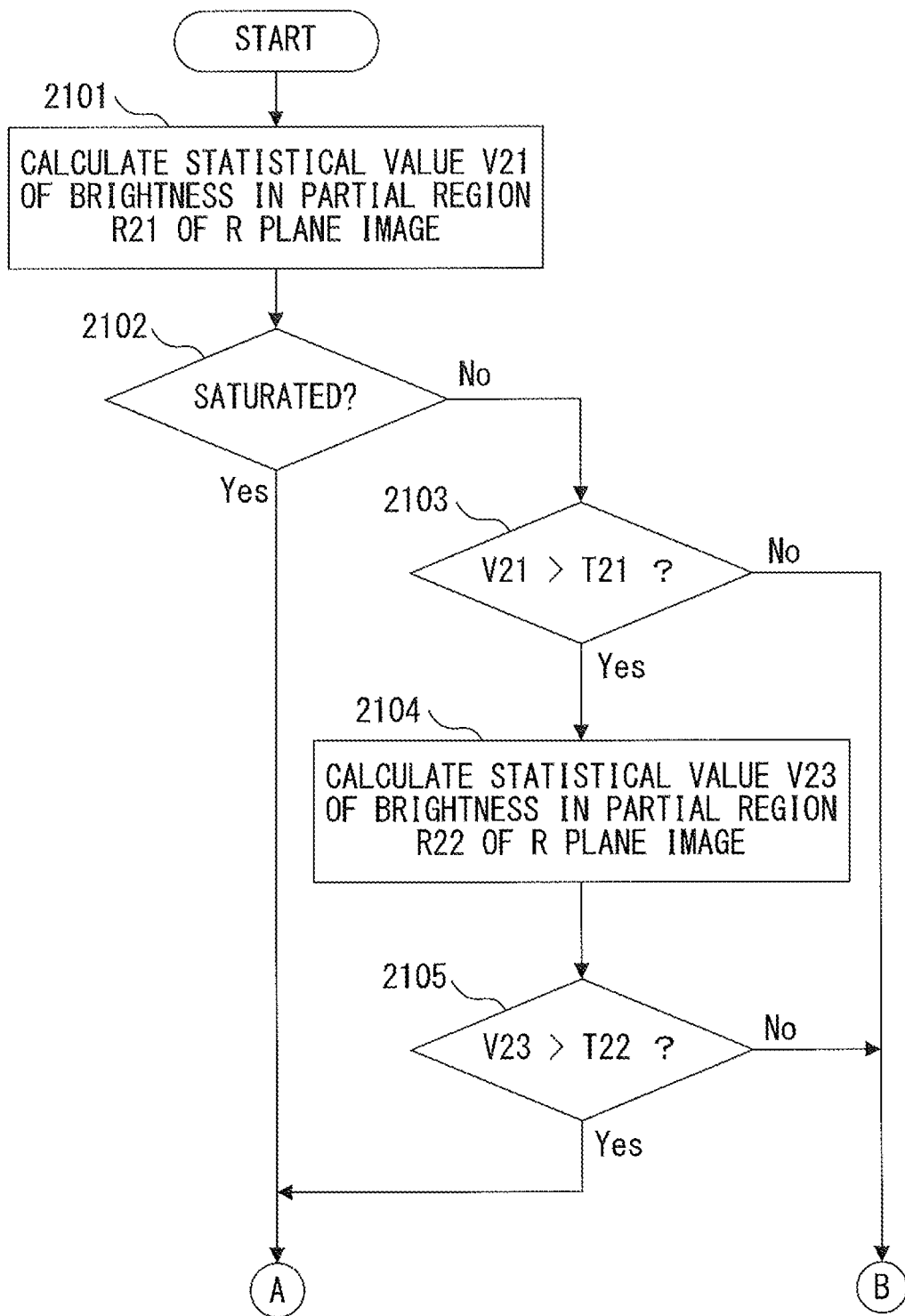
FIG. 21A is a flowchart of a proximate state determination process using an R plane image, a B plane image and a threshold (a first part)
Figure 21B:
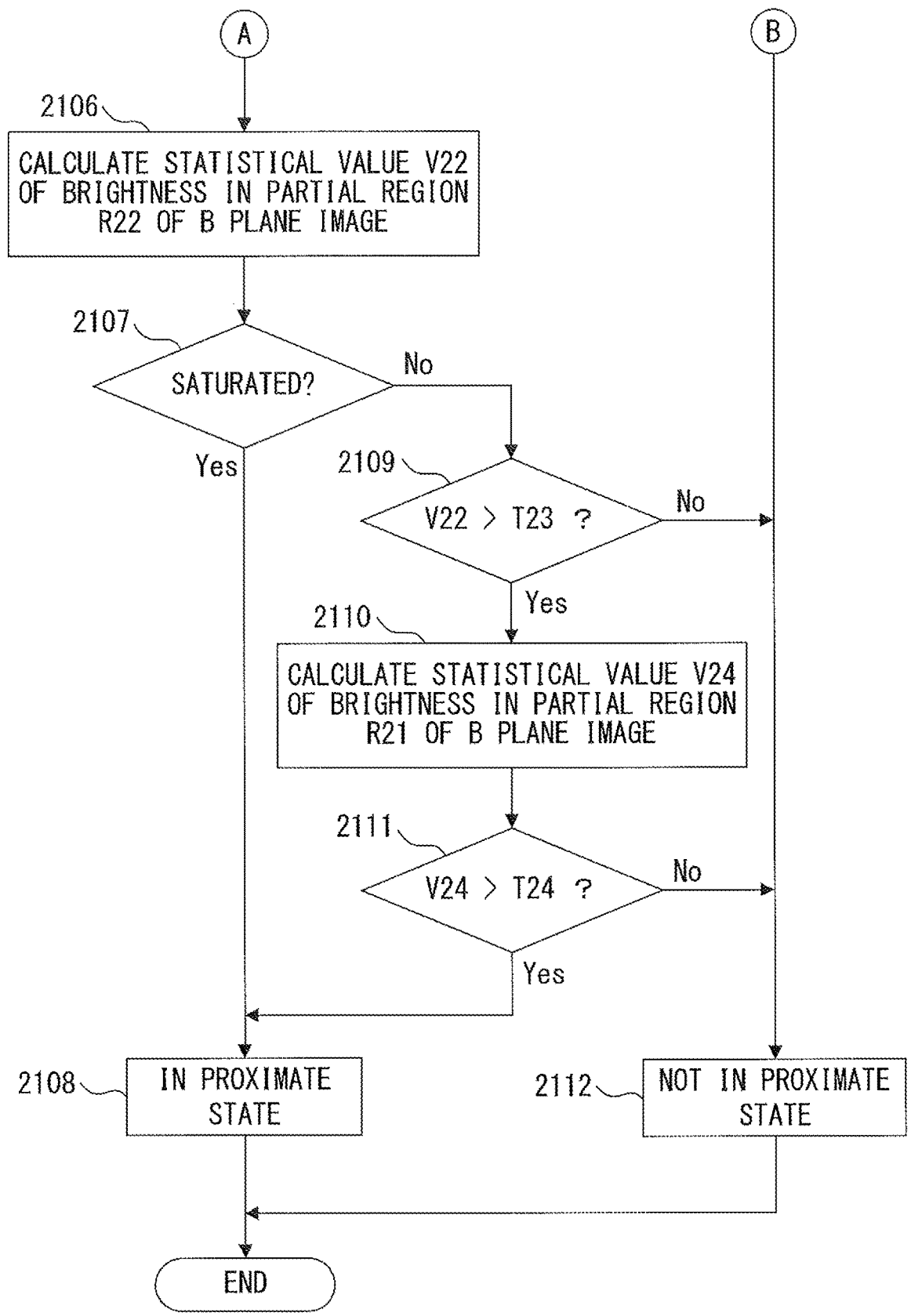
FIG. 21B is a flowchart of a proximate state determination process using an R plane image, a B plane image and a threshold (a second part)

FIG. 21A and FIG. 21B are flowcharts illustrating an example of a proximate state determination process using an R plane image, a B plane image and a threshold. The processes in step 2101 and step 2102 of FIG. 21A are similar to those in step 2001 and step 2002 of FIG. 20.

When partial region R21 of the R plane image is not saturated (NO in step 2102), the process unit 113 compares statistical value V21 with threshold T21 (step 2103). As threshold T21, a value that is smaller than the prescribed value used in step 2102 is used.

When statistical value V21 is greater than threshold T21 (YES in step 2103), the process unit 113 calculates statistical value V23 of the brightness in partial region R22 of the R plane image (step 2104), and compares statistical value V23 with threshold T22 (step 2105). As threshold T22, a value that is smaller than threshold T21 is used.

When statistical value V21 is equal to or smaller than threshold T21 (NO in step 2103) or when statistical value V23 is equal to or smaller than threshold T22 (NO in step 2105), the process unit 113 determines that the subject 121 and the sensor 201 are not in a proximate state (step 2112).

When partial region R21 of the R plane image is saturated (YES in step 2102) or when statistical value V23 is greater than threshold T22 (YES in step 2105), the process unit 113 executes the processes in step 2106 and step 2107. The processes in step 2016 and step 2017 are similar to those in step 2004 and step 2005 of FIG. 20.

When partial region R22 of the B plane image is saturated (YES in step 2107), the process unit 113 determines that the subject 121 and the sensor 201 are in a proximate state (step 2108).

When partial region R22 of the B plane image is not saturated (NO in step 2107), the process unit 113 compares statistical value V22 with threshold T23 (step 2109). As threshold T23, a value that is smaller than the prescribed value used in step 2107 is used.

When statistical value V22 is greater than threshold T23 (YES in step 2109), the process unit 113 calculates statistical value V24 of the brightness in partial region R21 of the B plane image (step 2110), and compares statistical value V24 with threshold T24 (step 2111). As threshold T24, a value that is smaller than threshold T23 is used.

When statistical value V24 is greater than threshold T24 (YES in step 2111), the process unit 113 determines that the subject 121 and the sensor 201 are in a proximate state (step 2108). When statistical value V22 is equal to or smaller than threshold T23 (NO in step 2109) or when statistical value V24 is equal to or smaller than threshold T24 (NO in step 2111), the process unit 113 determines that the subject 121 and the sensor 201 are not in a proximate state (step 2112).

Figure 22A:
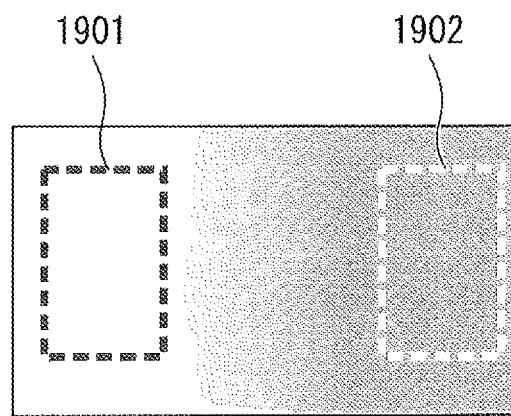
FIG. 22A illustrates an R plane image in a proximate state.
Figure 22B:
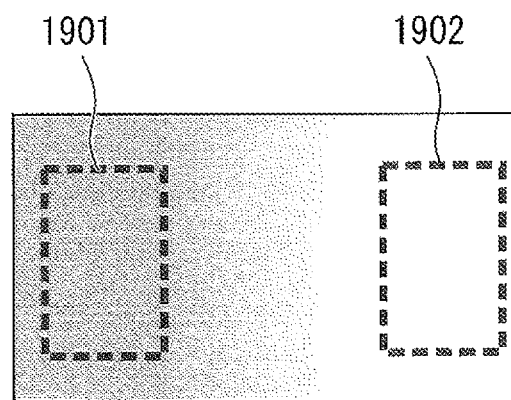
FIG. 22B illustrates an B plane image in a proximate state.

FIG. 22A and FIG. 22B illustrate examples of an R plane image and a B plane image in a case when a palm exists at the position of the plane 1202 and the palm and the sensor 201 are in a proximate state. FIG. 22A illustrates an R plane image and FIG. 22B illustrates a B plane image.

In this example, statistical value V21 of the partial region 1901 of the R plane image is greater than threshold T21 and statistical value V23 of the partial region 1902 of the R plane image is greater than threshold T22. Also, statistical value V22 of the partial region 1902 of the B plane image is greater than threshold T23 and statistical value V24 of the partial region 1901 of the B plane image is greater than threshold T24. Accordingly, even when the partial region 1901 and the partial region 1902 are not saturated, it is determined that the subject 121 and the sensor 201 are in a proximate state.

Figure 23A:
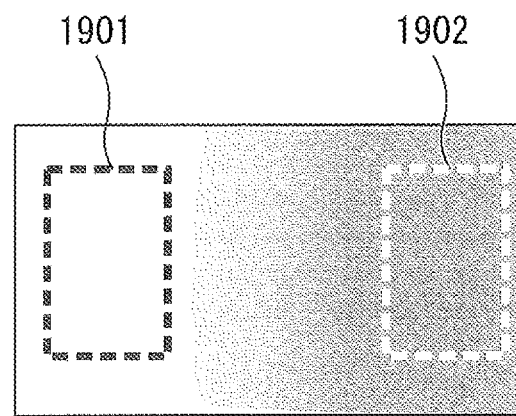
FIG. 23A illustrates an R plane image not in a proximate state.
Figure 23B:
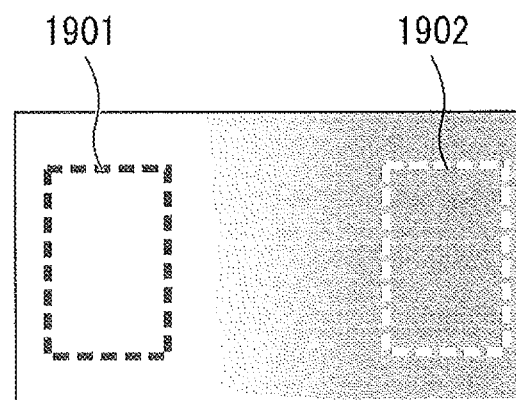
FIG. 23B illustrates a B plane image not in a proximate state.

FIG. 23A and FIG. 23B illustrate examples of an R plane image and a B plane image in a case when a palm is at the position of the plane 1201. FIG. 23A illustrates an R plane image and FIG. 23B illustrates a B plane image. In these examples, statistical value V21 of the partial region 1901 of the R plane image is greater than threshold T21 and statistical value V23 of the partial region 1902 of the R plane image is greater than statistical value V22. However, because statistical value V22 of the partial region 1902 of the B plane image is smaller than threshold T23, it is determined that the subject 121 and the sensor 201 are not in a proximate state.

FIG. 24 illustrates a functional configuration example of a biometric authentication apparatus including the image capturing apparatus 101. A biometric authentication apparatus 2401 illustrated in FIG. 24 includes the image capturing apparatus 101, a characteristics extraction unit 2411, a verification unit 2412, a determination unit 2413 and a storage unit 2414.

The image capturing apparatus 101 may use visible light for capturing an image of the palm print or palm shape of a palm, a face, or other object or may use near infrared rays for capturing an image of a palm or veins of a finger. The storage unit 2414 stores a template 2423 of an authentication target person. The template 2423 is characteristics information extracted from the biometric information of an authentication target person, and is registered in the storage unit 2414 in advance.

The image capturing apparatus 101 captures an image of part of the body of an authentication target person and stores a captured image 2421 in the storage unit 2414. The characteristics extraction unit 2411 extracts characteristic information 2422 from the image 2421 and stores the extracted information in the storage unit 2414. The verification unit 2412 compares the characteristics information 2422 with the template 2423 so as to calculate similarity between them. The determination unit 2413 compares the similarity with a prescribed threshold so as to determine whether or not the authentication succeeded.

FIG. 25 is a flowchart illustrating a biometric authentication process performed by the biometric authentication apparatus 2401 illustrated in FIG. 24. The processes in step 2501 through 2505 in FIG. 25 are similar to those in step 301 through 305 illustrated in FIG. 3.

When the subject 121 and the light source unit 112 are not in a proximate state (NO in step 2504), the characteristics extraction unit 2411 extracts the characteristics information 2422 from the image 2421 stored in the storage unit 2414 (step 2506). Next, the verification unit 2412 compares the characteristics information 2422 with the template 2423 so as to calculate the similarity (step 2507), and the determination unit 2413 compares the similarity with a threshold (step 2508).

When the similarity is greater than the threshold (YES in step 2508), the determination unit 2413 outputs an authentication result indicating success in the authentication, and the light source unit 112 stops illuminating the subject 121 (step 2509). When the similarity is equal to or lower than the threshold, the determination unit 2413 outputs an authentication result indicating failure in the authentication, and the biometric authentication apparatus 2401 repeats the processes in and subsequent to step 2502.

Note that the template 2423 may also be registered in a database that is external to the biometric authentication apparatus 2401. In such a case, the biometric authentication apparatus 2401 obtains the template 2423 from the database via a communication network in step 2507.

The biometric authentication apparatus 2401 illustrated in FIG. 24 eliminates the necessity of additionally providing a distance sensor, a proximity detection sensor or other devices, making it possible to downsize information terminals and reduce hardware cost. The distance sensor or the proximity detection sensor includes for example an image pickup unit and a light source unit and thus has a similar configuration to that of the sensor 201, and accordingly when the necessity for the sensor or the proximity detection sensor is eliminated, 50% of the hardware cost can be reduced at the maximum.

Also, when the subject 121 and the sensor 201 are determined to be not in a proximate state, biometric authentication can immediately be conducted on the basis of the image 211 that was used for the determination, causing no time-lags. Accordingly, because an image used for determination of a proximate state and an image used for biometric authentication do not shift from each other even when the subject 121 is moving, an image captured at an appropriate distance is used for biometric authentication, leading to increased authentication accuracy.

The configurations of the image capturing apparatus 101 illustrated in FIG. 1 and FIG. 2 are just exemplary, and some of the constituents may be omitted or changed in accordance with the purposes or conditions of the image capturing apparatus 101. For example, in the image capturing apparatus 101 of FIG. 2, image pickup unit 111 and the light source unit 112 may be provided separately instead of providing the sensor 201 including the image pickup unit 111 and the light source unit 112.

The configurations of the sensor 201 illustrated in FIG. 6 and FIG. 12 are just exemplary, and some of the constituents may be omitted or changed in accordance with the purposes or conditions of the image capturing apparatus 101. For example, a light source that is not an illumination device described in Patent Document 2 may be used as the light source 602 and the light source 603. In such a case, the light source 602 and the light source 603 may be arranged in a direction that is not orthogonal to the optical axis 611 and a distance between the light source 603 and the camera 601 do not have to be the same as a distance between the light source 602 and the camera 601.

The configuration of the biometric authentication apparatus 2401 illustrated in FIG. 24 is just exemplary, and some of the constituents may be omitted or changed in accordance with the purposes or conditions of the biometric authentication apparatus 2401.

The flowcharts illustrated in FIG. 3, FIG. 8, FIG. 10, FIG. 14, FIG. 16, FIG. 20, FIG. 21A, FIG. 21B and FIG. 25 are just exemplary, and some of the processes may be omitted or changed in accordance with the purposes or conditions of the image capturing apparatus 101 or the biometric authentication apparatus 2401.

The images illustrated in FIG. 4A, FIG. 4B, FIG. 7, FIG. 9, FIG. 11, FIG. 13, FIG. 15, FIG. 17, FIG. 19A, FIG. 19B, FIG. 22A, FIG. 22B, FIG. 23A and FIG. 23B are just exemplary, and the images may change in accordance with the subject 121 and the sensor 201. The image capturing apparatus 101 may perform a proximate state determination process by using a G plane image instead of the B plane image illustrated in FIG. 19B, FIG. 22B and FIG. 23B. The partial regions illustrated in FIG. 7, FIG. 9, FIG. 11, FIG. 13, FIG. 15, FIG. 17, FIG. 19A, FIG. 19B, FIG. 22A, FIG. 22B, FIG. 23A and FIG. 23B are just exemplary, and a partial region having a different shape or set at a different position may be used.

The guidance information illustrated in FIG. 5A and FIG. 5B is just exemplary, and a different message may be used as guidance information. The output unit 114 can also output an audio message as guidance information. The RGB filter illustrated in FIG. 18 is just exemplary, and a different primary color filter, a complementary color filter, etc. may be used as a long-wavelength filter and a short-wavelength filter.

FIG. 26 illustrates a configuration example of an information processing apparatus (computer) that is used as the image capturing apparatus 101 illustrated in FIG. 1 and FIG. 2 and the biometric authentication apparatus 2401 illustrated in FIG. 24. The information processing apparatus illustrated in FIG. 26 includes a Central Processing Unit (CPU) 2601, a memory 2602, an input device 2603, an output device 2604, an auxiliary storage device 2605, a medium driving device 2606 and a network connection device 2607. These constituents are connected to each other via a bus 2608. The image pickup unit 111 and the light source unit 112 illustrated in FIG. 1 or the sensor 201 illustrated in FIG. 2 may be connected the bus 2608.

The memory 2602 is for example a semiconductor memory such as a Read Only Memory (ROM), a Random Access Memory (RAM), a flash memory, etc., and stores a program and data used for processes. The memory 2602 can be used as the storage unit 202 illustrated in FIG. 2 or as the storage unit 2414 illustrated in FIG. 24.

The CPU 2601 (processor) executes a program by using for example the memory 2602 so as to operate as the process unit 113 illustrated in FIG. 1 and FIG. 2, and the characteristics extraction unit 2411, the verification unit 2412 and the determination unit 2413 illustrated in FIG. 24.

The input device 2603 is for example a keyboard, a pointing device, etc., and is used for inputting instructions or information from an operator or a user. The output device 2604 is for example a display device, a printer, a speaker, etc., and is used for outputting inquiries to the operator or the user or for outputting process results. The output device 2604 can be used as the output unit 114 illustrated in FIG. 1 and FIG. 2 or as the display device 501 illustrated in FIG. 5. A process result in the proximate state detection process illustrated in FIG. 3 may be the guidance information 212 and a process result in the biometric authentication process illustrated in FIG. 25 may be the authentication result.

The auxiliary storage device 2605 is for example a magnetic disk device, an optical disk device, a magneto-optical disk device, a tape device, etc. The auxiliary storage device 2605 may be a hard disk drive. The information processing apparatus can store a program and data in the auxiliary storage device 2605 beforehand so as to load them onto the memory 2602 and use them. The auxiliary storage device 2605 can be used as the storage unit 202 illustrated in FIG. 2 or the storage unit 2414 illustrated in FIG. 24.

The medium driving device 2606 drives a portable recording medium 2609 so as to access information recorded in it. The portable recording medium 2609 is a memory device, a flexible disk, an optical disk, a magneto-optical disk, etc. The portable recording medium 2609 may be a Compact Disk Read Only Memory (CD-ROM), a Digital Versatile Disk (DVD), a Universal Serial Bus (USB) memory, etc. The operator or the user can store a program and data in the portable recording medium 2609 so as to load them onto the memory 2602 and use them.

As described above, a computer-readable recording medium that stores a program and data used for processes is a physical (non-transitory) recording medium such as the memory 2602, the auxiliary storage device 2605 or the portable recording medium 2609.

The network connection device 2607 is a communication interface that is connected to a communication network such as a Local Area Network, a Wide Area Network, etc. so as to perform data conversion accompanying communications. The information processing apparatus can receive a program and data from an external device via the network connection device 2607 and load them onto the memory 2602 and use them.

Note that it is not necessary for the information processing apparatuses to include all the constituents illustrated in FIG. 26, and some of the constituents can be omitted in accordance with the purposes or conditions. For example, when it is not necessary to input instructions or information from the operator or the user, the input device 2603 can be omitted. When the portable recording medium 2609 or a communication network is not used, the medium driving device 2606 or the network connection device 2607 can be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various

What is claimed is:

1. An image capturing apparatus comprising:
a camera that captures an image of a subject;
a light source that illuminates with light a plane intersecting an optical axis of the camera at a prescribed angle; and
a processor that is coupled to the camera, that sets as a region of interest a partial region, in which a portion at a position that is closer to the light source than a position corresponding to the optical axis on the subject is captured in the image of the subject which is illuminated with the light, that performs a calculation by using a plurality of pixel values in the partial region, that determines whether the subject and the light source are in a proximate state based on a result of the calculation, that generates guidance information indicating that the subject and the light source are in the proximate state when the subject and the light source are in the proximate state, and that outputs the guidance information.

2. The image capturing apparatus according to claim 1, wherein the processor determines that the subject and the light source are in the proximate state when the partial region is saturated.

3. The image capturing apparatus according to claim 1, wherein
the portion is a first portion of the subject,
the partial region is a first partial region in which the first portion of the subject is captured in the image, and
the processor detects that the subject and the light source are in the proximate state by using the plurality of pixel values in the first partial region and a plurality of pixel values in a second partial region, in which a second portion of the subject at a position that is more distant from the light source than the position of the first portion is captured in the image.

4. The image capturing apparatus according to claim 3, wherein the processor determines that the subject and the light source are in the proximate state when the first partial region is not saturated, a statistical value of the plurality of pixel values in the first partial region is greater than a first threshold and a statistical value of the plurality of pixel values in the second partial region is greater than a second threshold, which is smaller than the first threshold.

5. The image capturing apparatus according to claim 1, wherein
the light source includes a first light source and a second light source that are respectively provided on both sides of the camera in a direction intersecting the optical axis at the prescribed angle,
the portion is a first portion at a position that is closer to the first light source than the position corresponding to the optical axis on the subject,
the partial region is a first partial region in which the first portion of the subject is captured in the image, and
the processor detects that the subject and the light source including the first light source and the second light source are in the proximate state by using the plurality of pixel values in the first partial region and a plurality of pixel values in a second partial region, in which a second portion at a position that is closer to the second light source than the position corresponding to the optical axis on the subject is captured in the image.

6. The image capturing apparatus according to claim 5, wherein the processor determines that the subject and the light source including the first light source and the second light source are in the proximate state when the first partial region or the second partial region is saturated.

7. The image capturing apparatus according to claim 1, wherein
the light source includes a first light source and a second light source that are respectively provided on both sides of the camera in a direction intersecting the optical axis at the prescribed angle,
the portion is a first portion at a position that is closer to the first light source than the position corresponding to the optical axis on the subject,
the partial region is a first partial region in which the first portion of the subject is captured in the image, and
the processor detects that the subject and the light source including the first light source and the second light source are in the proximate state by using the plurality of pixel values in the first partial region a plurality of pixel values in a second partial region, in which a second portion at a position that is closer to the second light source than the position corresponding to the optical axis on the subject is captured in the image, and a plurality of pixel values in a third partial region, in which a third portion at the position corresponding to the optical axis on the subject is captured in the image.

8. The image capturing apparatus according to claim 7, wherein the processor determines that the subject and the light source including the first light source and the second light source are in the proximate state when a statistical value of the plurality of pixel values in the first partial region is smaller than a first threshold, a statistical value of the plurality of pixel values in the second partial region is smaller than a second threshold and a statistical value of the plurality of pixel values in the third partial region is greater than a third threshold.

9. The image capturing apparatus according to claim 1, wherein
the light source includes a first light source and a second light source that are respectively provided on both sides of the camera in a direction intersecting the optical axis at the prescribed angle,
the first light source emits a near infrared ray,
the second light source emits visible light,
the image includes a first image of the subject captured via a first filter, which has a higher transmissivity for light of a first wavelength than a transmissivity for light of a second wavelength that is shorter than the first wavelength, and a second image of the subject captured via a second filter, which has a higher transmissivity for light of the second wavelength than a transmissivity for light of the first wavelength,
the portion is a first portion at a position that is closer to the first light source than the position corresponding to the optical axis on the subject,
the partial region is a first partial region in which the first portion of the subject is captured in the first image, and
the processor detects that the subject and the light source including the first light source and the second light source are in the proximate state by using the plurality of pixel values in the first partial region and a plurality of pixel values in a second partial region, in which a second portion at a position that is closer to the second light source than the position corresponding to the optical axis on the subject is captured in the second image.

10. The image capturing apparatus according to claim 9, wherein the processor determines that the subject and the light source including the first light source and the second light source are in the proximate state when the first partial region or the second partial region is saturated.

11. The image capturing apparatus according to claim 1, wherein the light source includes a first light source and a second light source that are respectively provided on both sides of the camera in a direction intersecting the optical axis at the prescribed angle, the first light source emits a near infrared ray, the second light source emits visible light, the image includes a first image of the subject captured via a first filter, which has a higher transmissivity for light of a first wavelength than a transmissivity for light of a second wavelength that is shorter than the first wavelength, and a second image of the subject captured via a second filter, which has a higher transmissivity for light of the second wavelength than a transmissivity for light of the first wavelength, the portion is a first portion at a position that is closer to the first light source than the position corresponding to the optical axis on the subject, the partial region is a first partial region in which the first portion of the subject is captured in the first image, and the processor detects that the subject and the light source including the first light source and the second light source are in the proximate state by using the plurality of pixel values in the first partial region, a plurality of pixel values in a second partial region, in which a second portion at a position that is closer to the second light source than the position corresponding to the optical axis on the subject is captured in the first image, a plurality of pixel values in a third partial region, in which the second portion is captured in the second image, and a plurality of pixel values in a fourth partial region, in which the first portion is captured in the second image.

12. The image capturing apparatus according to claim 11, wherein the processor determines that the subject and the light source including the first light source and the second light source are in the proximate state when the first partial region is not saturated, a statistical value of the plurality of pixel values in the first partial region is greater than a first threshold, a statistical value of the plurality of pixel values in the second partial region is greater than a second threshold, which is smaller than the first threshold, the third partial region is not saturated, a statistical value of the plurality of pixel values in the third partial region is greater than a third threshold and a statistical value of the plurality of pixel values in the fourth partial region is greater than a fourth threshold, which is smaller than the third threshold.

13. A biometric authentication apparatus comprising:

a camera that captures an image of a subject;

a light source that illuminates with light a plane intersecting an optical axis of the camera at a prescribed angle;

a memory that stores the image of the subject which is illuminated with the light; and a processor that is coupled to the memory, that sets as a region of interest a partial region, in which a portion at a position that is closer to the light source than a position corresponding to the optical axis on the subject is captured in the image of the subject which is illuminated with the light, that performs a calculation by using a plurality of pixel in the partial region, that determines whether the subject and the light source are in a proximate state based on a result of the calculation, that generates guidance information indicating that the subject and the light source are in the proximate state when the subject and the light source are in the proximate state, that outputs the guidance information, that extracts a characteristic from an image captured by the camera and stored in the memory and not determined to be an image in which the subject and the light source are in the proximate state, and that performs verification based on a result of an extraction of the characteristic.

14. The image capturing apparatus according to claim 1, wherein the plane is determined by a scope where an image-capturing scope of the camera and an illumination scope of the light source are overlapping.

* * * * *